US011050745B2

(12) United States Patent
Tanaka et al.

(10) Patent No.: US 11,050,745 B2
(45) Date of Patent: Jun. 29, 2021

(54) INFORMATION PROCESSING APPARATUS, AUTHENTICATION METHOD, AND RECORDING MEDIUM FOR RECORDING COMPUTER PROGRAM

(71) Applicant: NEC CORPORATION, Tokyo (JP)

(72) Inventors: Yuki Tanaka, Tokyo (JP); Jun Furukawa, Tokyo (JP); Kazuma Ohara, Tokyo (JP); Toshinori Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 298 days.

(21) Appl. No.: 15/753,053

(22) PCT Filed: Aug. 18, 2016

(86) PCT No.: PCT/JP2016/003777
§ 371 (c)(1),
(2) Date: Feb. 15, 2018

(87) PCT Pub. No.: WO2017/033442
PCT Pub. Date: Mar. 2, 2017

(65) Prior Publication Data
US 2018/0241747 A1 Aug. 23, 2018

(30) Foreign Application Priority Data

Aug. 26, 2015 (JP) .............................. JP2015-166696

(51) Int. Cl.
*H04L 9/32* (2006.01)
*H04L 29/06* (2006.01)
(Continued)

(52) U.S. Cl.
CPC .......... *H04L 63/0869* (2013.01); *G06F 21/31* (2013.01); *G06F 21/45* (2013.01);
(Continued)

(58) Field of Classification Search
CPC .... H04L 63/0869; H04L 9/3242; G06F 21/34
See application file for complete search history.

(56) References Cited

U.S. PATENT DOCUMENTS 6,959,394 B1 * 10/2005 Brickell ............... G06Q 20/206
380/44
9,258,117 B1 * 2/2016 Roth ..................... H04L 9/0861
(Continued)

FOREIGN PATENT DOCUMENTS

JP 2007-312128 A 11/2007
JP 2010-011109 A 1/2010
(Continued)

OTHER PUBLICATIONS

Masayuki Fukumitsu et al., "A Proposal of a Password Manager Satisfying Security and Usability by Using the Secret Sharing and a Personal Server", CSS2014 Computer Security Symposium 2014 Proceedings, jointly held with anti Malware engineering WorkShop 2014, Information Processing Society of Japan Symposium Series, vol. 2014, Ronbunshu Godo Kaisai Anti Malware Engineering Workshop (MWS) 2014 IPSJ Symposium Series, Oct. 22, 2014, pp. 619 to 626, vol. 2014, No. 2.
(Continued)

Primary Examiner — Phy Anh T Vu
(74) Attorney, Agent, or Firm — Sughrue Mion, PLLC

(57) ABSTRACT

An information processing apparatus that authenticates sets of distributed authentication information without collecting, the sets of distributed authentication information, to be collected at any one of apparatuses included in a system. The apparatus includes: a secure computation unit that determines whether master authentication information, which is stored in advance and is one information to be compared for authentication, matches authentication information, which is received from a first information processing apparatus and is the other information to be compared for authentication, by
(Continued)

executing secure computation with a second information processing apparatus based on one set of distributed master authentication information obtained by distributing the master authentication information by using a secret distribution method and based on one set of distributed authentication information obtained by distributing the authentication information by the secret distribution method; and a process execution unit that executes a predetermined process based on the determination result.

9 Claims, 10 Drawing Sheets

(51) Int. Cl.
G06F 21/31 (2013.01)
G06F 21/45 (2013.01)
H04L 9/08 (2006.01)

(52) U.S. Cl.
CPC ............ H04L 9/085 (2013.01); H04L 9/3242 (2013.01); H04L 63/061 (2013.01); H04L 63/123 (2013.01)

(56) References Cited

U.S. PATENT DOCUMENTS

| | | | | |
|---|---|---|---|---|
| 2006/0177061 A1* | 8/2006 | Orsini | ............... | G06F 21/62 380/268 |
| 2007/0283161 A1* | 12/2007 | Yami | ............... | H04L 9/3226 713/183 |
| 2008/0235772 A1* | 9/2008 | Janzen | ............... | G06F 21/31 726/5 |
| 2010/0215172 A1* | 8/2010 | Schneider | ............... | H04L 9/085 380/28 |
| 2014/0089196 A1* | 3/2014 | Paya | ............... | G06F 21/31 705/44 |
| 2015/0149769 A1* | 5/2015 | D'Souza | ............... | H04L 9/085 713/156 |
| 2015/0295928 A1* | 10/2015 | Fan | ............... | H04L 63/0485 713/169 |
| 2015/0378842 A1* | 12/2015 | Tomlinson | ............... | H04L 9/085 380/28 |
| 2016/0330018 A1* | 11/2016 | Miyata | ............... | H04L 9/0625 |
| 2020/0213099 A1* | 7/2020 | Wright | ............... | H04L 9/088 |
| 2020/0213135 A1* | 7/2020 | Wainblat | ............... | H04L 9/3249 |

FOREIGN PATENT DOCUMENTS

| | | |
|---|---|---|
| JP | 2013-020313 A | 1/2013 |
| WO | 2015/114947 A1 | 8/2015 |

OTHER PUBLICATIONS

International Search Report to PCT/JP2016/003777 dated Nov. 15, 2016.

* cited by examiner

INFORMATION PROCESSING APPARATUS, AUTHENTICATION METHOD, AND RECORDING MEDIUM FOR RECORDING COMPUTER PROGRAM

CROSS REFERENCE TO RELATED APPLICATIONS

This application is a National Stage of International Application No. PCT/JP2016/003777 filed Aug. 18, 2016, claiming priority based on Japanese Patent Application No. 2015-166696 filed Aug. 26, 2015.

TECHNICAL FIELD

The present invention relates to an authentication system using an information processing apparatus (computer).

BACKGROUND ART

In various services used through the Internet, a method of using an identifier (ID) and a password is often used when a service authenticates a user.

When a password is changed for each service to be used, an amount of time and effort expended by a user for password management increases. On the other hand, when one password is shared among a plurality of services, there is a risk that a password leaking out from a certain service is used for unauthorized use of another service.

As a technology of mitigating such a risk, a password management method called an on-line password manager is used. In the on-line password manager, a server centrally managing information about an ID and a password for each service used by a user (hereinafter referred to as a "password management server") is used. A user undergoes authentication by the password management server prior to using a service. Then, when the authentication is passed, the user is able to receive an ID and a password related to the desired service. A user has only to hold sufficient information (a master password) to be authenticated by the password management server. Accordingly, an amount of time and effort expended by a user for password management is small in the on-line password manager.

As a technology related to such an on-line password manager, for example, PTL 1 discloses a distributed data storage system preventing unauthorized acquisition of partial data generated from important data by a secret distribution technology. In the distributed data storage system described in PTL 1, an authentication processing unit in each server storing partial data retains a hashed password obtained by hashing a password for each user, and a user seed unique to a user. Then, when providing the partial data, the authentication processing unit in each server performs user authentication by using the server seed unique to each server, and respective pieces of the aforementioned information for each user. Thus, each server prevents unauthorized acquisition of partial data.

PTL 2 discloses an authentication unit and the like managing authentication information required for user authentication by using a secret distribution method. The authentication unit in a terminal described in PTL 2 stores a plurality of pieces of distributed information obtained by distributing authentication information by the secret distribution method, into a plurality of terminals, respectively. Upon authentication, the authentication unit reconstructs the authentication information on the basis of distributed information collected from a predetermined number of terminals. Then, the authentication unit performs authentication by comparing the reconstructed authentication information with input authentication information. Thus, the authentication unit is able to prevent leakage of the authentication information in a case that any of the terminals is lost.

CITATION LIST

Patent Literature

PTL 1: Japanese Unexamined Patent Application Publication No. 2013-020313
PTL 2: Japanese Unexamined Patent Application Publication No. 2010-011109

SUMMARY OF INVENTION

Technical Problem

However, in the aforementioned on-line password manager and each server disclosed in PTL 1, a password management server stores all information required for user authentication. There is a problem that, when such information leaks out, a master password of a user may be identified by using the information.

The reason is that, in a case that a set of an ID and a password has such a length (shortness) that can be memorized by a user, even when the set is hashed as described in PTL 1, a password candidate may be checked one by one by using the hashed password.

Further, the authentication unit disclosed in PTL 2 has a problem upon authentication, that distributed information needs to be collected at a timing when legitimacy of a user is not yet confirmed. Accordingly, a terminal masquerading as another terminal is able to collect the distributed information. Then, there is a problem that the masquerading terminal is able to use the collected distributed information as a material for identifying authentication information.

An object of the present invention is to provide an information processing apparatus and the like capable of authenticating pieces of distributed authentication information without collecting the pieces of the distributed information into any one of apparatuses included in a system from respective apparatuses individually storing the pieces of the distributed information.

Solution to Problem

In order to achieve the aforementioned object, a second information processing apparatus according to one aspect of the present invention includes the following configuration.

A second information processing apparatus comprising:
secure computation means that checks whether or not authentication information matches master authentication information, by executing secure computation through communication with another second information processing apparatus, on the basis of
one piece of distributed master authentication information obtained by distributing, by a secret distribution method, the master authentication information being information checked upon authentication on one side, the distributed master authentication information being previously stored, and
one piece of distributed authentication information obtained by distributing, by a secret distribution method, the authentication information being information checked upon the authentication on another side, the distributed authentication information being received from a first information processing apparatus connected through communication; and processing execution means that executes predetermined processing depending on a check result.

In order to achieve the aforementioned object, a first information processing apparatus according to one aspect of the present invention is connected to a system including a plurality of the first information processing apparatuses each including the aforementioned configuration, the first information processing apparatus including:

a secret distribution means that distributes authentication information based on input first input information into a plurality of pieces of distributed authentication information by a secret distribution method; and a communication control means that transmits the respective pieces of distributed authentication information to the plurality of second information processing apparatuses in a distributed manner.

In order to achieve the aforementioned object, an authentication method according to one aspect of the present invention includes, by an information processing apparatus:

distributing, by a secret distribution method, authentication information based on first input information input to a first information processing apparatus into a plurality of pieces of distributed authentication information;

transmitting the respective pieces of distributed authentication information in a distributed manner from the first information processing apparatus to a plurality of second information processing apparatuses previously storing, in a distributed manner, respective pieces of distributed master authentication information being information obtained by distributing, by a secret distribution method, master authentication information being information checked upon authentication;

checking whether or not the authentication information matches the master authentication information by executing secure computation through communication between at least part of the plurality of second information processing apparatuses on the basis of the distributed authentication information received from the first information processing apparatus and the distributed master authentication information; and executing, by at least one of the plurality of second information processing apparatuses executing the secure computation, predetermined processing depending on a check result.

Further, the object is also achieved by a computer program providing, with a computer, each of the first and second information processing apparatuses including the respective aforementioned configurations, and the related method, and also by a computer-readable storage medium storing the computer program.

Advantageous Effects of Invention

The present invention provides an advantageous effect that information leakage from any information processing apparatus constituting a system does not cause a master password of a user to be identified from the leaked information.

DESCRIPTION OF EMBODIMENTS

Next, example embodiments of the present invention will be described in detail referring to drawings.

First, a secret distribution method and a secure computation method used in each example embodiment will be described.

The secret distribution method is a technology of generating a plurality of pieces of distributed information from secret information. The distributed information is generated in such a way that secret information can be reconstructed from a predetermined combination but not from other combinations. The secret distribution method is proposed in, for example, "How to Share a Secret" by Adi Shamir, Commun. ACM 22 (11), pp. 612 to 613, 1979. Various other methods are known as the secret distribution method. Processing of generating distributed information from secret information may be hereinafter referred to as "distribution processing." Further, processing of reconstructing secret information with a plurality of pieces of distributed information as input may be referred to as "reconstruction processing."

The secure computation method is a technology capable of executing computation related to data distributed by a secret distribution method. The secure computation method is proposed in, for example, "Completeness Theorems for Non-Cryptographic Fault-Tolerant Distributed Computation (Extended Abstract)" by Michael Ben-Or, Shafi Goldwasser, and Avi Wigderson, Proceedings of the 20th Annual ACM Symposium on Theory of Computing, 1988. Various other methods are known as the secure computation method. The secure computation method is able to execute any operation on distributed data groups being distributed by a secret distribution method and being stored in a plurality of servers in a distributed manner, without entailing data reconstruction. In other words, the secure computation method does not require data reconstruction, and therefore is able to perform an operation without collecting the distributed data groups in one place.

For example, as an operation method of checking whether or not data A given by a secure computation method match distributed data B (distributed data group), a method described in "Unconditionally Secure Constant-Rounds Multi-party Computation for Equality, Comparison, Bits and Exponentiation" by Ivan Damgard, Matthias Fitzi, Eike Kiltz, Jesper Buus Nielsen, and Tomas Toft, Theory of Cryptography Lecture Notes in Computer Science Volume 3876, pp. 285 to 304, 2006, and the like are known. The aforementioned method includes an operation of making a decision on a match between a distributed information group A obtained by distributing input information A and information B (distributed information group B) previously distributed and stored, according to the respective example embodiments described below. Various methods other than the above are known as the operation method of making a decision on a match.

First Example Embodiment

Figure 1:
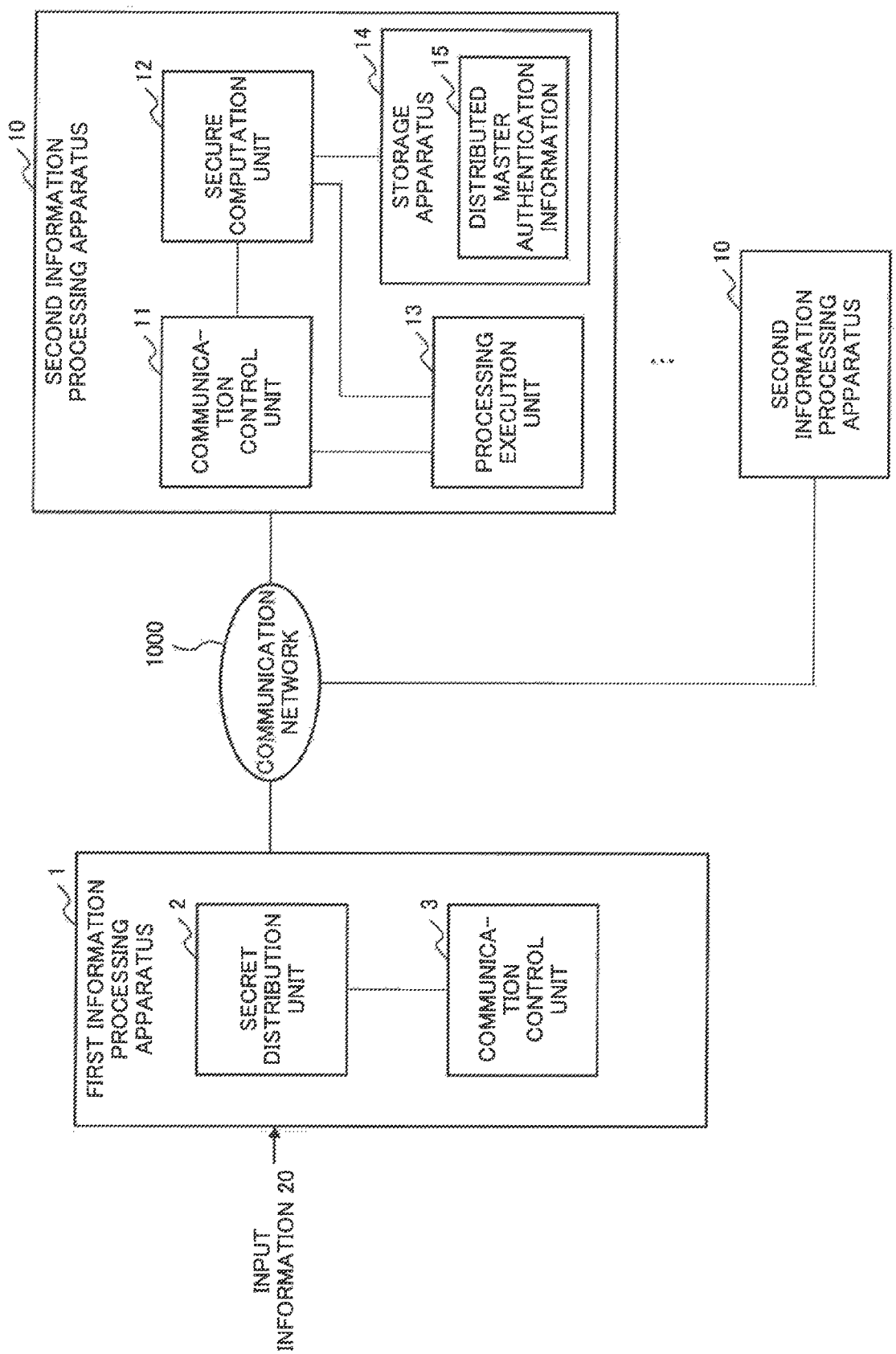
FIG. 1 is a block diagram illustrating a configuration of an authentication system according to a first example embodiment of the present invention.

FIG. 1 is a block diagram illustrating a configuration of an authentication system according to a first example embodiment of the present invention.

Referring to FIG. 1, the authentication system according to the present example embodiment includes a first information processing apparatus 1 and a plurality of second information processing apparatuses 10.

The first information processing apparatus 1 and the respective second information processing apparatuses 10 may communicate with one another through a communication network (hereinafter simply referred to as a network) 1000 such as the Internet or a local area network (LAN).

Each of the first information processing apparatus 1 and the second information processing apparatus 10 may be configured with a common information processing apparatus (computer) operating under control of a computer program (software program) executed by using a central processing unit (CPU: unillustrated). Alternatively, each unit in the first information processing apparatus 1 and the second information processing apparatus 10 may be configured with a dedicated hardware device or a logic circuit. A hardware configuration example providing each of the first information processing apparatus 1 and the second information processing apparatus 10 with a computer will be described later, referring to FIG. 10.

The first information processing apparatus 1 includes a secret distribution unit 2 and a communication control unit 3.

The secret distribution unit 2 distributes, for example, authentication information based on input information 20 input through a user manipulation or the like into a plurality of pieces of distributed authentication information by a secret distribution method. For example, the input information 20 is information sufficient for executing authentication, such as a set of an ID and a related password in ID password authentication. The authentication information is information generated on the basis of the input information 20. For example, the authentication information may be the input information 20 in part or in whole.

The communication control unit 3 is able to control communication between the first information processing apparatus 1 (local apparatus) and the respective second information processing apparatuses 10. The communication control unit 3 transmits each piece of distributed authentication information generated by the secret distribution unit 2 to each of the plurality of second information processing apparatuses 10.

The second information processing apparatus 10 includes a communication control unit 11, a secure computation unit 12, a processing execution unit 13, and a storage apparatus 14. The storage apparatus 14 is able to store distributed master authentication information 15. For example, the storage apparatus 14 is provided by a semiconductor memory device, or a disk device.

The distributed master authentication information 15 is one of a plurality of pieces of information obtained by distributing master authentication information by distribution processing. The master authentication information is information on one side, being checked against authentication information in authentication. The authentication information generated in the first information processing apparatus 1 may be viewed as information on the other side, being checked against the master authentication information in the authentication. For example, the master authentication information is information based on information such as a master password being an original checked for a match against authentication information based on the input information 20 such as a password. The distributed master authentication information 15 according to the present example embodiment is previously stored in the storage apparatus 14.

The communication control unit 11 is able to control communication between the local apparatus, and the first information processing apparatus 1 and another second information processing apparatus 10.

The secure computation unit 12 executes secure computation through communication with another second information processing apparatus 10 on the basis of distributed master authentication information 15 and a piece of distributed authentication information received from the first information processing apparatus 1 through the communication control unit 11. By the secure computation, the secure computation unit 12 checks whether or not authentication information being the basis of the distributed authentication information matches master authentication information being the basis of the distributed master authentication information 15. The secure computation performed by the secure computation unit 12 is executed between at least part of the second information processing apparatuses 10 included in the present example embodiment. By a characteristic of the aforementioned secure computation method, the secure computation (an operation of making a check for match) is executed without collecting the pieces of distributed master authentication information 15 and the pieces of distributed authentication information in any one of the second information processing apparatuses 10.

Depending on a result of the check (authentication) mode by the secure computation unit 12 on whether or not authentication information matches master authentication information, the processing execution unit 13 executes predetermined processing. For example, when the check result is that authentication information is matches the master authentication information (successful authentication), the processing execution unit 13 may provide predetermined information for the first information processing apparatus 1. Alternatively, the processing execution unit 13 may simply notify the check result (i.e. successful or unsuccessful authentication) to the first information processing apparatus 1.

Thus, the present example embodiment is able to authenticate pieces of distributed master authentication information 15 being distributed, without collecting the pieces of the information in any one of apparatuses included in the system from the respective second information processing apparatuses 10 individually storing the pieces of the information.

As described above, the present example embodiment provides an effect of providing an information processing apparatus and the like capable of authenticating pieces of distributed authentication information without collecting the pieces of the information in any one of apparatuses included in a system from respective apparatuses individually storing the pieces of the information. In other words, it may be viewed that the present example embodiment provides an effect that information leakage from any information processing apparatus constituting a system does not cause master authentication information of a user to be identified from the information in a single information processing apparatus.

The reason is that, by secure computation, the secure computation unit 12 in the second information processing apparatus 10 is able to check-whether authentication information transmitted from the first information processing apparatus 1 matches master authentication information without collecting distributed master authentication information 15. There is no single information processing apparatus handling information by which the master authentication information can be reconstructed upon authentication, according to the present example embodiment. Further, a terminal masquerading as the first information processing apparatus 1 is not able to acquire the distributed master authentication information 15 either, according to the present example embodiment.

A modified example of the present example embodiment may be considered as follows.

For example, the first information processing apparatus 1 and one of the second information processing apparatuses 10 may be implemented in a same information processing apparatus.

Second Example Embodiment

Next, a second example embodiment based on the aforementioned first example embodiment will be described.

A case of applying the present invention to a service access information management system will be described as an example of the present example embodiment. The service access information is a generic name for information used upon access to each service, such as user authentication information for each of various services and information about an encryption key. The service access information management system is also generally called a password management system.

Figure 2:
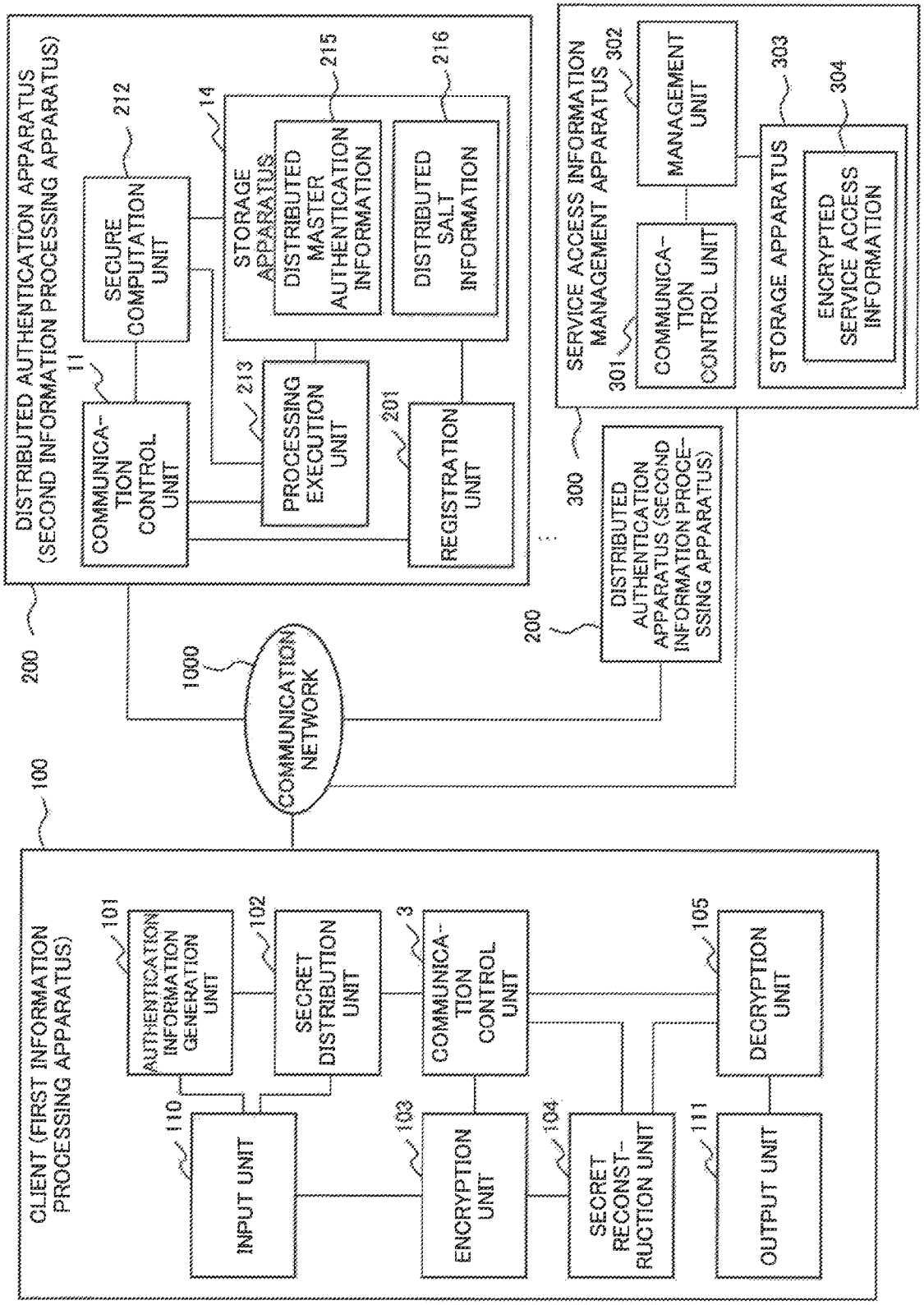
FIG. 2 is a block diagram illustrating a configuration of a service access information management system according to a second example embodiment of the present invention.

FIG. 2 is a block diagram illustrating a configuration of a service access information management system according to the second example embodiment of the present invention. Referring to FIG. 2, the service access information management system according to the present example embodiment includes a client (first information processing apparatus) 100, a plurality of distributed authentication apparatuses (second information processing apparatuses) 200, and a service access information management apparatus 300. The client 100 is based on the first information processing apparatus 1 according to the first example embodiment. The distributed authentication apparatus 200 is based on the second information processing apparatus 10 according to the first example embodiment.

The distributed authentication apparatus 200 and the service access information management apparatus 300 correspond to an apparatus (group) managing service access information in a password management system. As described in the "Background Art" section, a password management system in which the client 100 and the apparatus (group) managing service access information are connected through a network is particularly called an on-line password manager. The service access management system according to the present example embodiment is hereinafter referred to as an on-line password manager.

First, an overview of an example of processing in the on-line password manager according to the present example embodiment will be described below. As an example, the on-line password manager according to the present example embodiment is able to execute three types of processing being user registration, service registration, and service use.

In the user registration processing, a user registers in the on-line password manager a master password being a character string used for user authentication when using the on-line password manager and user ID information indicating a user ID. The master password is an example of the master authentication information according to the first example embodiment. The user registers the master password distributed by a secret distribution method as information associated with the user ID information (distributed master authentication information 215) in each distributed authentication apparatus 200 through the client 100, according to the present example embodiment. The distributed master authentication information 215 is based on the distributed master authentication information 15 according to the first example embodiment. In other words, the user registration processing according to the present example embodiment corresponds to processing of registering the distributed master authentication information 15 in the storage apparatus 14 in the second information processing apparatus 10 according to the first example embodiment. The user registration processing may also be viewed as processing of preparing a system environment enabling execution of authentication according to the first example embodiment.

Further, in the user registration processing, the user may also register in the on-line password manager salt information indicating a salt used in encryption and decryption of service access information. Similarly to the master password, the salt information is registered in each distributed authentication apparatus 200 as distributed salt information 216 distributed by the secret distribution method. The salt information being distributed is hereinafter referred to as distributed salt information 216.

Further, in the service registration processing and the service use processing, the user manages service access information for a plurality of services by using the client 100. First, in the service registration processing, the user registers the service access information in the on-line password manager. The user registers the service access information being encrypted (encrypted service access information 304) in the service access information management apparatus 300 through the client 100, according to the present example embodiment. Then, when using a service, the user acquires encrypted service access information 304 related to the desired service from the on-line password manager, as the service use processing. The user acquires, through the client 100, service access information obtained by decrypting the encrypted service access information 304 registered in the service access information management apparatus 300, according to the present example embodiment.

As an initial stage of the service registration processing and the service use processing, the user undergoes user authentication for use of the on-line password manager, by using the master password and the user ID information that are registered by the user registration processing. The user authentication is authentication based on the first example embodiment. In other words, the on-line password manager according to the present example embodiment executes authentication based on the first example embodiment as the user authentication included in the service registration processing and the service use processing. The word "user authentication" hereinafter refers to user authentication in both the service registration processing and the service use processing unless otherwise noted.

As an example of the input information 20 according to the first example embodiment, upon user authentication, the user inputs a password (character string) matching the master password. The password is an example of authentication information according to the first example embodiment. By hereinafter simply calling a character string input by the user in user authentication a "password," the password is distinguished from a "master password" registered in the user registration.

When the user authentication is successful, the user is permitted to register or acquire service access information, by receiving distributed salt information 216 from each distributed authentication apparatus 200.

Specifically, by using salt information reconstructed from the distributed salt information 216, the client 100 is able to execute each type of encryption and decryption processing of the aforementioned service access information. The user is able to use a desired service by using decrypted service access information. Such processing in the on-line password manager enables the user to use various services merely by memorizing a set of user ID information and a master password.

As described above, the user registration processing is performed prior to the service registration processing and the service use processing. In other words, the user registration processing is performed prior to the authentication. Further, the service registration processing is performed prior to the service use processing.

Next, referring to FIG. 2, a configuration of the service access information management system according to the present example embodiment will be described in detail. A part characteristic of the second example embodiment will be mainly described below, and a component according to the second example embodiment having a configuration similar to that according to the first example embodiment is given a same reference sign as that given in the first example embodiment, thus omitting overlapping detailed description thereof.

The client 100, the respective distributed authentication apparatuses 200, and the service access information management apparatus 300 may communicate with one another through a communication network (hereinafter simply referred to as a network) 1000 such as the Internet or a LAN.

Each of the client 100, the distributed authentication apparatus 200, and the service access information management apparatus 300 may be configured with a common information processing apparatus (computer) operating under control of a computer program (software program) executed by using a CPU (unillustrated). Alternatively, each unit in the client 100, the distributed authentication apparatus 200, and the service access information management apparatus 300 may be configured with a dedicated hardware device or a logic circuit. A hardware configuration example providing each of the client 100, the distributed authentication apparatus 200, and the service access information management apparatus 300 with a computer will be described later referring to FIG. 10.

The client 100 includes an authentication information generation unit 101, an encryption unit 103, a secret reconstruction unit 104, a decryption unit 105, an input unit 110, and an output unit 111, in addition to a communication control unit 3 and a secret distribution unit 102 each based on the first example embodiment.

The input unit 110 is able to accept information input from a user in each type of processing in the aforementioned on-line password manager. Specifically, the input unit 110 is able to accept a user ID, a master password (second input information), salt information (third input information), a password (first input information), and service access information (fourth input information). The aforementioned first to fourth input information and user ID are examples of the input information 20 according to the first example embodiment. For example, the input unit 110 may accept input through an unillustrated keyboard, pointing device, touch panel, or the like. For example, the input unit 110 may accept input by a communication from an external apparatus connected by the communication control unit 3 or an unillustrated communication function.

Based on information input through the input unit 110, the authentication information generation unit 101 is able to generate authentication information and master authentication information being pieces of information sufficient for executing authentication. The master authentication information and the authentication information, according to the present example embodiment, are based on the master authentication information and the authentication information, according to the first example embodiment, respectively. The authentication information generation unit 101 according to the present example embodiment generates the master authentication information by performing a predetermined operation on a master password input in the user registration processing. Further, as an example, the authentication information generation unit 101 generates the authentication information by performing a predetermined operation on a password input upon user authentication in the service registration processing and the service use processing.

As an example of a predetermined operation, the authentication information generation unit 101 according to the present example embodiment computes a hash value with a master password or a password as an input. In other words, each piece of the master authentication information and the authentication information, according to the present example embodiment, is information generated on the basis of a hash value. Various methods other than the above may be employed as the method of the predetermined operation performed by the authentication information generation unit 101. Specifically, the authentication method according to the present example embodiment is a method of checking a hash value based on the master password being a first character string against a hash value and based on an input password being a second character string while the two are being respectively distributed by a secure computation method.

The secret distribution unit 102 is based on the secret distribution unit 2 according to the first example embodiment. Similarly to the secret distribution unit 2 according to the first example embodiment, the secret distribution unit 102 according to the present example embodiment distributes authentication information generated by the authentication information generation unit 101 upon user authentication into a plurality of pieces of distributed authentication information by the secret distribution method. Additionally, the secret distribution unit 102 according to the present example embodiment also distributes, by the secret distribution method, master authentication information generated by the authentication information generation unit 101 in the user registration processing and salt information input through the input unit 110.

The communication control unit 3 is based on the communication control unit 3 according to the first example embodiment. Similarly to the communication control unit 3 according to the first example embodiment, upon user authentication, the communication control unit 3 transmits each piece of distributed authentication information distributed by the secret distribution unit 102, being associated with user ID information, to each of the plurality of distributed authentication apparatuses 200.

In the user registration processing, the communication control unit 3 according to the present example embodiment transmits each piece of distributed master authentication information 215 and distributed salt information 216 respectively distributed by the secret distribution unit 102, being associated with user ID information, to each of the plurality of distributed authentication apparatuses 200. Specifically, the communication control unit 3 transmits each piece of distributed salt information 216 to each distributed authentication apparatus 200 as "deposit information" to be previously deposited. The deposit information is later returned to the client 100 under a condition and at a timing respectively determined by each distributed authentication apparatus 200. As an example, when authentication is determined to be successful, the communication control unit 3 according to the present example embodiment receives the deposit information (distributed salt information 216) from each distributed authentication apparatus 200.

In the service registration processing and the service use processing, the communication control unit 3 is able to control communication related to each piece of information exchanged between each distributed authentication apparatus 200 and the service access information management apparatus 300.

Structures and functions of the secret distribution unit 102 and the communication control unit 3 are similar to those of the corresponding function units according to the first example embodiment except for the points described above, and therefore overlapping detailed description thereof is omitted.

When user authentication in the service registration processing and the service use processing is successful, the secret reconstruction unit 104 is able to reconstruct salt information with the respective pieces of the distributed salt information 216 received from the respective distributed authentication apparatuses 200 through the communication control unit 3 as inputs.

In the service registration processing, the encryption unit 103 encrypts input service access information. The service access information being encrypted is hereinafter referred to as encrypted service access information 304. The encryption unit 103 performs encryption by using an encryption key generated on the basis of salt information reconstructed by the secret reconstruction unit 104. Further, the encryption unit 103 transmits the encrypted service access information 304 to the service access information management apparatus 300 through the communication control unit 3.

In the service use processing, the decryption unit 105 decrypts encrypted service access information 304 acquired from the service access information management apparatus 300 through the communication control unit 3. The decryption unit 105 performs decryption by using a decryption key generated on the basis of salt information reconstructed by the secret reconstruction unit 104. When the encryption method is a common key method, an encryption key and a decryption key may be the same. By being decrypted, the encrypted service access information 304 returns to service access information input in the service registration processing.

The output unit 111 outputs service access information decrypted by the decryption unit 105.

The output unit 111 may display the service access information on an unillustrated display, touch panel, or the like. The output unit 111 may output the service access information to an unillustrated storage apparatus, an external apparatus connected through the communication control unit 3, or the like. The output unit 111 may be used for message display when accepting input to the input unit 110, or the like.

Each distributed authentication apparatus 200 includes a registration unit 201, in addition to a communication control unit 11, a secure computation unit 212, a processing execution unit 213, and a storage apparatus 14 each based on the first example embodiment. The storage apparatus 14 according to the present example embodiment is able to store distributed master authentication information 215 and distributed salt information 216. For example, the storage apparatus 14 is realized by a semiconductor memory device, a disk device, or the like. Upon user registration, the distributed master authentication information 215 and the distributed salt information 216 are stored into the storage apparatus 14 by the registration unit 201, according to the present example embodiment.

The communication control unit 11 is based on the communication control unit 11 according to the first example embodiment. The communication control unit 11 is able to control communication between the local apparatus and, the client 100 and another distributed authentication apparatus 200.

The secure computation unit 212 is based on the secure computation unit 212 according to the first example embodiment. In user authentication, the secure computation unit 212 according to the present example embodiment executes secure computation through communication with another distributed authentication apparatus 200, on the basis of distributed master authentication information 215 and a piece of distributed authentication information received from the client 100 through the communication control unit 11. By the secure computation, the secure computation unit 212 check whether or not authentication information being the basis of the distributed authentication information received from the client 100 matches master authentication information being the basis of the distributed master authentication information 215 stored in the storage apparatus 14. In other words, the secure computation unit 212 checks whether or not the authentication information based on a password input in user authentication in the service registration processing and the service use processing matches the master authentication information based on a master password input in the user registration processing. The secure computation unit 212 according to the present example embodiment is able to execute secure computation performing hash computation in combination with secure computation checking for match. A structure and a function of the secure computation unit 212 is similar to those according to the first example embodiment except for the point described above, and therefore overlapping detailed description thereof is omitted.

The processing execution unit 213 is based on the processing execution unit 13 according to the first example embodiment. In user authentication, the processing execution unit 213 executes predetermined processing depending on a result of a check (authentication) mode by the secure computation unit 212 on whether or not authentication information matches master authentication information. As an example of the predetermined processing, when the check result represents successful authentication, the processing execution unit 213 according to the present example embodiment transmits distributed salt information 216 to the client 100. Specifically, when the authentication is successful, the processing execution unit 213 according to the present example embodiment is able to transmit deposit information (distributed salt information 216) being previously deposited information to the requester of the authentication.

In the user registration processing, the registration unit 201 receives a piece of distributed master authentication information 215 and a piece of distributed salt information 216 from the client 100 through the communication control unit 11. Then, the registration unit 201 is able to store the received piece of distributed master authentication information 215 and distributed salt information 216, being respectively associated with user ID information, into the storage apparatus 14.

The service access information management apparatus 300 includes a communication control unit 301, a management unit 302, and a storage apparatus 303. The storage apparatus 303 is able to store encrypted service access information 304. The encrypted service access information 304 is stored into the storage apparatus 303 by the management unit 302 in the service registration processing.

The communication control unit 301 is able to control communication between the local apparatus and the client 100.

In the service registration processing, the management unit 302 is able to store encrypted service access information 304 received from the client 100 through the communication control unit 301, being associated with user ID information and service name information, into the storage apparatus 303. Further, in the service use processing, the management unit 302 is able to transmit the encrypted service access information 304 to the client 100 through the communication control unit 301.

Next, an operation of the present example embodiment including the aforementioned configuration will be described in detail. The on-line password manager according to the present example embodiment performs the aforementioned three types of processing being the user registration processing, the service registration processing, and the service use processing. Operations in the respective types of processing will be sequentially described below.

Operation in User Registration Processing

Figure 3:
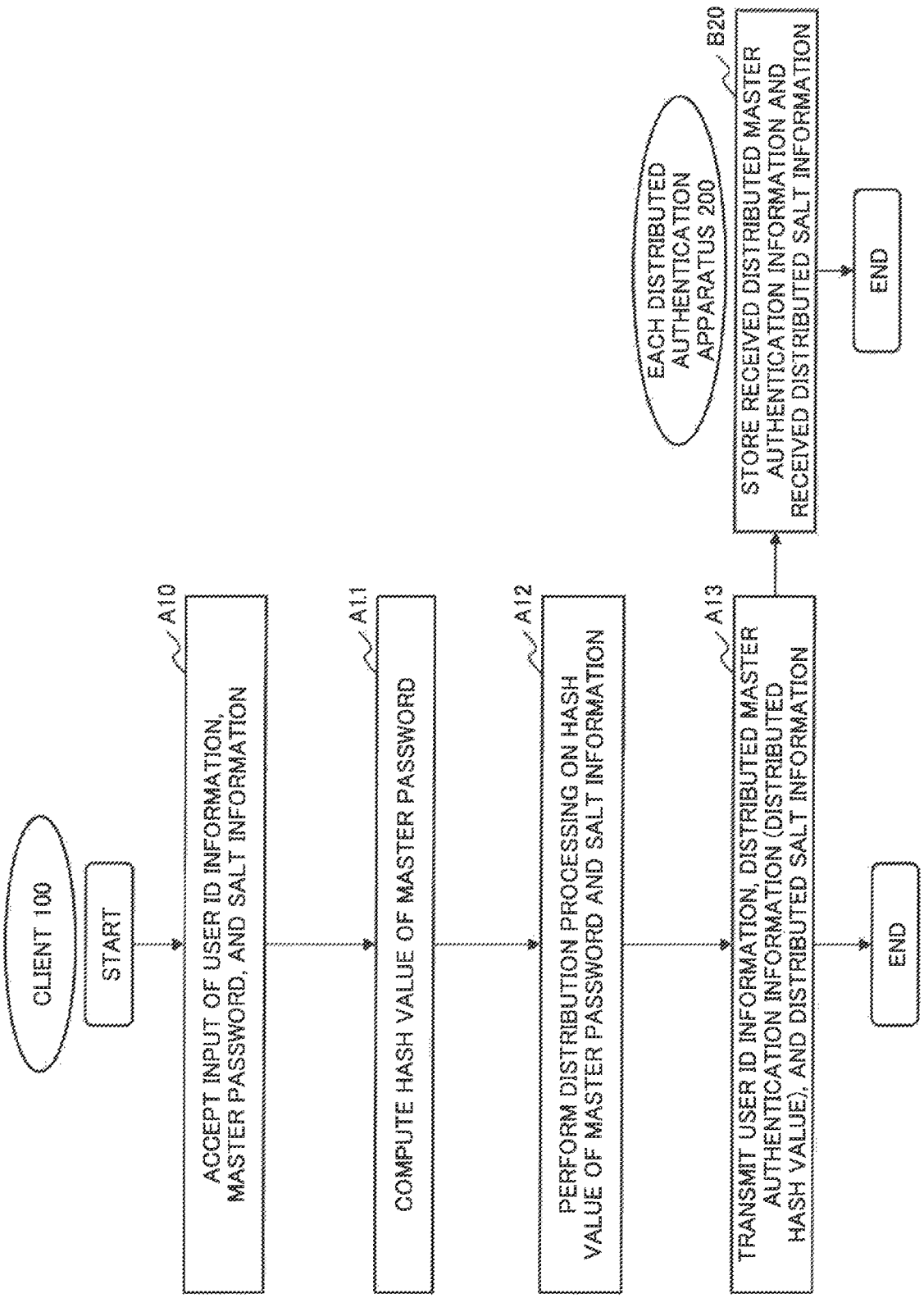
FIG. 3 is a flowchart illustrating operations performed by a client 100 and each distributed authentication apparatus 200 in user registration processing, according to the second example embodiment.

Referring to FIG. 3, an operation in the user registration processing will be described below. FIG. 3 is a flowchart illustrating operations performed by the client 100 and each distributed authentication apparatus 200 in the user registration processing according to the second example embodiment.

First, a user inputs user ID information, a master password, and salt information into the client 100. In the client 100, the input unit 110 accepts the input of the user ID information, the master password, and the salt information (Step A10). The pieces of information may be automatically generated by the input unit 110 or an unillustrated function unit, in place of input by the user. An amount of information (a length of a character string) in a combination of the master password and the user ID information is generally determined to be an amount of information that can be memorized by the user.

Next, the authentication information generation unit 101 generates master authentication information on the basis of the input information. As a specific example, the authentication information generation unit 101 according to the present example embodiment computes a hash value of the master password (Step A11). As the computation method of the hash value, the authentication information generation unit 101 may use a hash function for encryption, such as the Secure Hash Algorithm (SHA)-1, or a common key cryptographic method. Further, for example, the authentication information generation unit 101 may include the user ID information in addition to the master password as an input to the hash value computation. An auxiliary input may be included in addition to an input from the user as an input to the hash value computation. The hash value computation method may employ a well-known common method as described above, and therefore detailed description thereof according to the present example embodiment is omitted.

Next, the secret distribution unit 102 performs distribution processing by the secret distribution method on each of the generated master authentication information and the salt information input in Step A11. Specifically, the secret distribution unit 102 performs distribution processing on each of the hash value of the master password and the salt information (Step A12).

Next, the communication control unit 3 transmits (distributes) the user ID information, the hash value being distributed (distributed master authentication information 215), and the salt information being distributed (distributed salt information 216) to each distributed authentication apparatus 200 (Step A13). Specifically, the communication control unit 3 transmits a piece of distributed master authentication information 215 and a piece of distributed salt information 216 to the respective distributed authentication apparatuses 200 in a distributed manner, along with the user ID information.

In each distributed authentication apparatus 200, the registration unit 201 receives the user ID information, the distributed master authentication information 215, and the distributed salt information 216 through the communication control unit 11. Each registration unit 201 stores the distributed master authentication information 215 and the distributed salt information 216, being associated with the user ID information, into the storage apparatus 14 (Step B20).

The above describes the operation in the user registration processing.

Operation in Service Registration Processing

Figure 4:
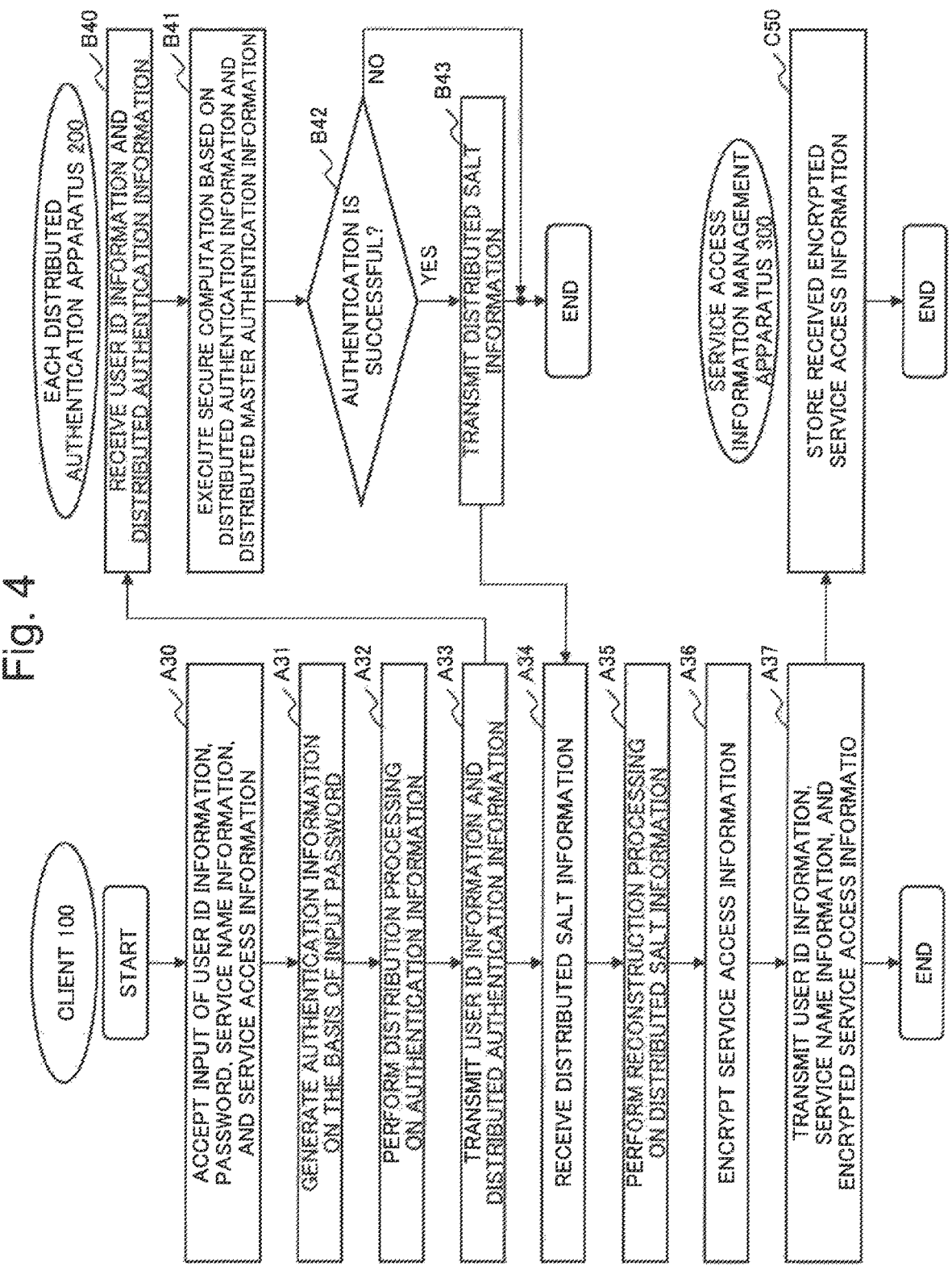
FIG. 4 is a flowchart illustrating operations performed by the client 100, each distributed authentication apparatus 200, and a service access information management apparatus 300 in service registration processing, according to the second example embodiment.

Referring to FIG. 4, an operation in the service registration processing will be described below. FIG. 4 is a flowchart illustrating operations performed by the client 100, each distributed authentication apparatus 200, and the service access information management apparatus 300 in the service registration processing according to the second example embodiment.

First, the user inputs the user ID information registered in the user registration processing, a password, service name information, and service access information into the client 100. The service name information is information indicating a name of a service being a target of registration by the user. The user inputs the password in such a way that the password matches the master password registered in the user registration processing. In the client 100, the input unit 110 accepts the input of the user ID information, the password, the service name information, and the service access information (Step A30).

The service access information may be assumed as information that the user intends to store externally in relation to a service name. For example, the service access information may be an ID (service ID) and a password (service password) that are used by the user in the registered service. Alternatively, in a case of an operation in which the user stores the service ID, the user may register the service password as the service access information. Further, the service password may be prepared by the user, or may be prepared on the service side. When the user prepares the service password, for example, the user may determine information with a length being too long to memorize but providing high security to be the service password, by using a random number generation program or the like.

First, the client 100 undergoes user authentication. The authentication information generation unit 101 generates authentication information on the basis of the input information (Step A31). Specifically, the authentication information generation unit 101 computes a hash value of the input password. The computation method of the hash value is similar to the computation method of a hash value in the user registration processing (Step A11), and therefore overlapping detailed description thereof is omitted.

Next, the secret distribution unit 102 performs distribution processing on the generated authentication information (the hash value of the password) by the secret distribution method (Step A32). Information obtained by distributing the hash value of the password is hereinafter referred to as distributed authentication information.

Next, the communication control unit 3 transmits (distributes) the user ID information and the distributed authentication information to each distributed authentication apparatus 200 (Step A33). Specifically, along with the user ID information, the communication control unit 3 transmits a piece of distributed authentication information to each distributed authentication apparatus 200 in such a way that the distributed authentication information is distributed over the respective distributed authentication apparatuses 200. For example, the communication control unit 3 may determine the transmission method of the user ID information and the distributed authentication information on the basis of a transmission destination, a transmission method, and the like of the distributed master authentication information 215 in Step A13 in the user registration processing.

In each distributed authentication apparatus 200, the communication control unit 11 receives the user ID information and the distributed authentication information (Step B40).

Next, the secure computation unit 212 executes secure computation through communication with another distributed authentication apparatus 200 on the basis of the received distributed authentication information and the distributed master authentication information 215 stored in association with the received user ID information (Step B41). Specifically, the secure computation unit 212 checks by the secure computation (operation) whether or not a hash value of the password being the basis of the distributed authentication information matches a hash value of the master password being the basis of the distributed master authentication information 215. Similarly to the first example embodiment, the secure computation performed by the secure computation unit 212 is executed between at least part of the distributed authentication apparatuses 200 included in the present example embodiment.

Upon execution of such computation, the secure computation unit 212 executes secure computation performing hash computation in combination with secure computation checking for match. An example of the operation method of secure computation is proposed in "Efficient Constant Round Multi-Party Computation Combining BMR and SPDZ" by Yehuda Lindell, Benny Pinkas, Nigel P. Smart, and Avishay Yanai, [Online], Cryptology ePrint Archive, [searched on Jul. 27, 2015], the Internet URL:https://eprint.iacr.org/2015/523.pdf>.

The secure computation unit 212 may execute a hash algorithm by secure computation executing common key cryptography described in the aforementioned document. A Cipher-based Message Authentication Code (CMAC) is well known as an example of the hash algorithm. For example, CMAC is described in "Recommendation for Block Cipher Modes of Operation: The CMAC Mode for Authentication" by Morris Dworkin, National Institute of Standards and Technology (NIST), Special Publication 800-38B, May, 2005. The operation method of match decision has been described at the beginning of the "Description of Embodiments" section, and therefore overlapping detailed description thereof is omitted.

When checking that the hash value of the password being the basis of the distributed authentication information matches the hash value of the master password being the basis of the distributed master authentication information 215, the secure computation unit 212 checks whether the authentication is successful. For example, the check method of authentication may perform successful authentication when a check result in every distributed authentication apparatus 200 participating in the secure computation in the authentication processing indicates a match. Alternatively, for example, the check method of authentication may determine the authentication result by a majority decision among distributed authentication apparatuses 200 participating in the secure computation in the authentication processing. One secure computation unit 212 may representatively make a check result of authentication. Alternatively, a plurality of secure computation units 212 may respectively make the check result of the authentication. The check method of authentication may employ various well-known common technologies including the above, and therefore detailed description thereof according to the present example embodiment is omitted.

When the secure computation unit 212 checks that the authentication is successful (YES in Step B42), the processing execution unit 213 executes predetermined processing. Specifically, as an example, the processing execution unit 213 transmits the distributed salt information 216 stored in association with the received user ID to the client 100 (Step B43). The processing is executed by distributed authentication apparatuses 200 a quantity of which at least being sufficient for satisfying a condition that pieces of distributed salt information 216 enabling reconstruction of salt information are provided for the client 100. The check method of a quantity of the distributed authentication apparatuses 200 executing the processing may employ a technology of a well-known common secret distribution method, and therefore detailed description thereof according to the present example embodiment is omitted.

When the secure computation unit 212 checks that the authentication is unsuccessful (NO in Step B42), the processing execution unit 213 executes predetermined processing. Specifically, as an example, the processing execution unit 213 simply ends the processing without transmitting the distributed salt information 216. For example, the processing execution unit 213 may execute another type of "predetermined processing" such as ending the processing after notifying unsuccessful authentication to the client 100.

An operation in a case of successful authentication will be described below. In the client 100, the communication control unit 3 receives distributed salt information 216 from each distributed authentication apparatus 200 (Step A34). The client 100 according to the present example embodiment becomes aware of successful authentication by the receipt of the distributed salt information 216. The above describes the user authentication undergone by the client 100.

Next, the secret reconstruction unit 104 performs reconstruction processing on a plurality of pieces of the received distributed salt information 216 (Step A35). As a result of the reconstruction processing, the salt information input in the user registration processing is reconstructed.

Next, the encryption unit 103 encrypts the service access information input in Step A30 (Step A36). Specifically, the encryption unit 103 first computes a secret key used for encryption, by inputting the input password and the reconstructed salt information into a key derivation function. As the key derivation function, the encryption unit 103 may employ a method using a hash function for encryption such as SHA-1 or a common key cryptography such as the Advanced Encryption Standard (AES). The encryption unit 103 may make a different key for each service by adding a service name and the like to the input to the key derivation function. Then, the encryption unit 103 encrypts the service access information by using the computed secret key.

The encryption unit 103 transmits the user ID information, the service name information, and the service access information being encrypted (encrypted service access information 304) to the service access information management apparatus 300 through the communication control unit 3 (Step A37).

In the service access information management apparatus 300, the management unit 302 stores the received encrypted service access information 304, being associated with the user ID information and the service name information, into the storage apparatus 303 (Step C50). The service access information management apparatus 300 may store the encrypted service access information 304 after confirming successful user authentication by the client 100. For example, the service access information management apparatus 300 may confirm the user authentication result by communicating with one of the distributed authentication apparatuses 200. Alternatively, the service access information management apparatus 300 may employ a method of confirming the user authentication result without confirmation through communication, on the basis of information verifying the successful authentication, the information being added by the client 100 when requesting registration of the encrypted service access information 304. The method of confirming the user authentication result may employ various well-known common technologies including the aforementioned method, and therefore detailed description thereof according to the present example embodiment is omitted.

The above describes the operation in the service registration processing.

Operation in Service Use Processing

Figure 5:
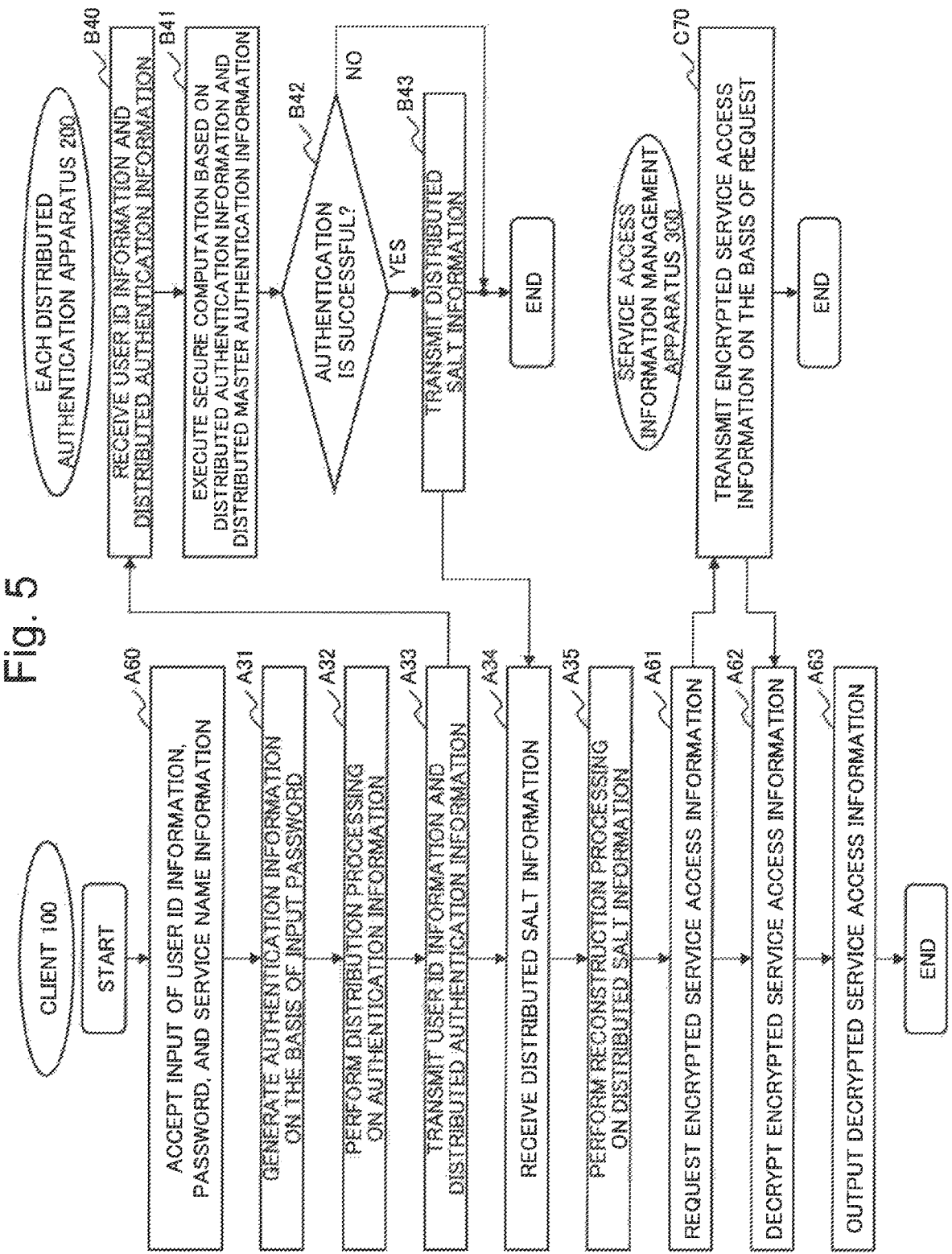
FIG. 5 is a flowchart illustrating operations performed by the client 100, each distributed authentication apparatus 200, and the service access information management apparatus 300 in service use processing, according to the second example embodiment.

Referring to FIG. 5, an operation in the service use processing will be described below. FIG. 5 is a flowchart illustrating operations performed by the client 100, each distributed authentication apparatus 200, and the service access information management apparatus 300 in the service use processing according to the second example embodiment.

First, the user inputs user ID information, a password, and service name information into the client 100. The service name information is information indicating a name of a service, service access information of which being acquired by the user, such as a name of a service to be used. The user inputs the user ID information and the password, similarly to the case with the service registration processing. In the client 100, the input unit 110 accepts the input of the user ID information, the password, and the service name information (Step A60).

Similarly to the service registration processing, the client 100 first undergoes user authentication. Then, when the user authentication is successful, the client 100 reconstructs salt information by reconstruction processing on distributed salt information. Respective Steps in the user authentication (Steps A31 to A34 and Steps B40 to B43) and the reconstruction processing of salt information (Step A35) are similar to those in the service registration processing, and therefore overlapping detailed description thereof is omitted.

After the reconstruction processing of salt information (Step A35), the decryption unit 105 requests encrypted service access information 304 to the service access information management apparatus 300 (Step A61). Specifically, by notifying the user ID information and the service name information to the service access information management apparatus 300, the decryption unit 105 requests transmission of related encrypted service access information 304.

In the service access information management apparatus 300, on the basis of the request from the client 100, the management unit 302 transmits encrypted service access information 304 related to the user ID information and the service name information to the client 100 (Step C70). The service access information management apparatus 300 may transmit the encrypted service access information 304 after confirming successful user authentication of the client 100. The method of confirming the user authentication result is similar to Step C50 in the service registration processing, and therefore overlapping detailed description thereof is omitted. Alternatively, since only a legitimate (successfully authenticated) client 100 is able to perform decryption, the service access information management apparatus 300 may transmit the encrypted service access information 304 without confirming successful user authentication.

In the client 100, the decryption unit 105 receives the encrypted service access information 304. Then, the decryption unit 105 decrypts the received encrypted service access information 304 (Step A62). Specifically, similarly to Step A36 in the service registration processing, the decryption unit 105 computes a secret key. Then, by using the computed secret key, the decryption unit 105 decrypts the encrypted service access information 304. As a result of the decryption, the decryption unit 105 is able to obtain same information as the service access information input in the service registration processing.

Finally, the output unit 111 outputs the decrypted service access information (Step A63). By using the output service access information, the user is able to use the desired service.

The above describes the operation in the service use processing.

As described above, in addition to an effect similar to that according to the aforementioned first example embodiment, the present example embodiment further provides an effect of improving security of a master password.

The reason is that, in the user registration processing, the secret distribution unit 102 in the client 100 bases distributed master authentication information 215 on a hash value of a master password computed through the authentication information generation unit 101, instead of the master password itself.

The present example embodiment also provides an effect of securely managing service access information.

The reason is that, in the user registration processing, the secret distribution unit 102 in the client 100 generates distributed salt information 216 by distributing salt information by the secret distribution method. Then, in the service registration processing, the secret reconstruction unit 104 collects (acquires) pieces of distributed salt information 216 stored in the respective distributed authentication apparatuses 200 and reconstructs the pieces of distributed salt information 216 as salt information. In other words, the present example embodiment provides an effect that, in case of information leakage from any information processing apparatus constituting the on-line password manager, the information cannot be used for identifying salt information required for decryption of encrypted service access information 304.

The present example embodiment further provides an effect that memorization of one set of user ID information and a password enables a user to use various services.

The reason is that, after successful user authentication with the set of the user ID information and the password, a plurality of distributed authentication apparatuses 200 provide the client 100 with distributed salt information 216 required for generating a secret key for decryption of encrypted service access information 304. By decrypting the encrypted service access information 304 on the basis of salt information obtained by decrypting the distributed salt information 216, the client 100 is able to acquire service access information for various services.

The present example embodiment further provides an effect of readily providing the client 100.

The reason is that the client 100 does not need to manage (store) any information requiring secrecy such as a password and salt information. Accordingly, an effect of a function of the client 100 being readily installed on various terminals is expected.

Modified examples of the present example embodiment may be considered as follows.

For example, the client 100 and one of the distributed authentication apparatuses 200 may be installed on a same information processing apparatus. Further, the service access information management apparatus 300 and one of the distributed authentication apparatuses 200 may be installed on a same information processing apparatus.

Similarly to the first example embodiment, an input master password and an input password may be used as is in whole or in part as master authentication information and authentication information, respectively.

Part of the processing sequence does not need to be followed as described above. For example, the input unit 110 may accept part of information at a timing other than that described above. Specifically, the input unit 110 may accept information other than user ID information and a password again after successful user authentication is confirmed, instead of in Step A30 in FIG. 4 or Step A60 in FIG. 5.

Further, for example, in the service use processing, the secret reconstruction unit 104 may execute reconstruction of the distributed salt information 216 (Step A35 in FIG. 5) at any timing before decryption of the encrypted service access information 304 (Step A62).

Third Example Embodiment

Next, a third example embodiment based on the aforementioned second example embodiment will be described. A part characteristic of the third example embodiment will be mainly described below, and a component according to the third example embodiment having a configuration similar to that according to the second example embodiment is given a same reference sign as that given in the second example embodiment, thus omitting overlapping detailed description thereof.

Figure 6:
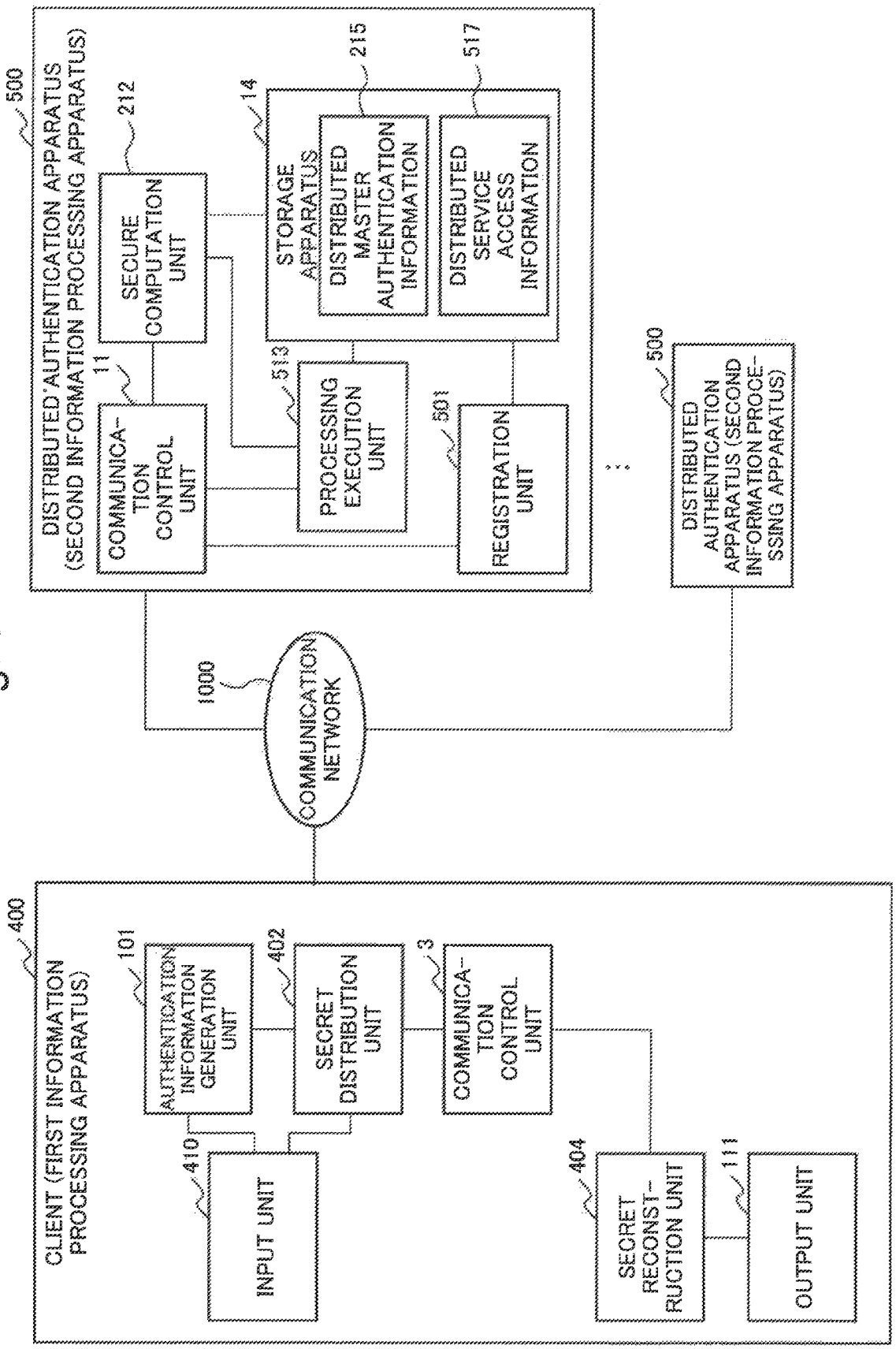
FIG. 6 is a block diagram illustrating a configuration of a service access information management system according to a third example embodiment of the present invention.

FIG. 6 is a block diagram illustrating a configuration of a service access information management system according to the third example embodiment of the present invention. Referring to FIG. 6, the service access information management system according to the present example embodiment includes a client (first information processing apparatus) 400 and a plurality of distributed authentication apparatuses (second information processing apparatuses) 500. The client 400 is based on the client 100 according to the second example embodiment. The distributed authentication apparatus 500 is based on the distributed authentication apparatus 200 according to the second example embodiment.

The present example embodiment differs from the second example embodiment in managing service access information in a distributed manner. Service access information according to the second example embodiment is protected by a cryptographic technology. However, service access information according to the present example embodiment is protected by being distributed by applying a secret distribution method, in place of the cryptographic technology. As an example, distributed service access information is stored in each distributed authentication apparatus 500 along with distributed master authentication information 215, according to the present example embodiment. Accordingly, the present example embodiment also differs from the second example embodiment in not including an apparatus corresponding to the service access information management apparatus 300.

Similarly to the second example embodiment, the service access information management system according to the present example embodiment may also be viewed as an on-line password manager. Similarly to the second example embodiment, the on-line password manager according to the present example embodiment is also able to execute three types of processing being user registration, service registration, and service use.

The client 400 and the respective distributed authentication apparatuses 500 may communicate with one another through a network 1000 such as the Internet or a LAN.

Each of the client 400 and the distributed authentication apparatus 500 may be configured with a common information processing apparatus (computer) operating under control of a computer program (software program) executed by using a CPU (unillustrated). Alternatively, each unit in the client 400 and the distributed authentication apparatus 500 may be configured with a dedicated hardware device or a logic circuit. A hardware configuration example providing each of the client 400 and the distributed authentication apparatus 500 with a computer will be described later referring to FIG. 10.

The client 400 includes a communication control unit 3, an authentication information generation unit 101, a secret distribution unit 402, a secret reconstruction unit 404, an input unit 410, and an output unit 111 each based on the second example embodiment. Structures and functions of the authentication information generation unit 101 and the output unit 111 are similar to those according to the second example embodiment, and therefore overlapping description thereof is omitted.

The input unit 410 differs from the second example embodiment in not receiving input of salt information. Specifically, the input unit 410 is able to accept a user ID, a master password (second input information), a password (first input information), and service access information (third input information). The secret distribution unit 402 and the secret reconstruction unit 404 differ from the second example embodiment in assuming service access information in place of salt information as a target of distribution processing or reconstruction processing in the secret distribution method. Further, the communication control unit 3 differs from the second example embodiment in transmitting and receiving distributed service access information 517 in place of distributed salt information 216 to and from each distributed authentication apparatus 500 and not handling encrypted service access information 304.

Specifically, in the service registration processing, the secret distribution unit 402 distributes service access information as distributed service access information 517 being distributed information, by distribution processing. Then, in the service use processing, the secret reconstruction unit 404 reconstructs distributed service access information 517 received from each distributed authentication apparatus 500 as service access information, by reconstruction processing. Structures and functions of the input unit 410, the secret distribution unit 402, the secret reconstruction unit 404, and the communication control unit 3 are similar to those according to the second example embodiment except for the points described above, and therefore overlapping detailed description thereof is omitted.

The distributed authentication apparatus 500 includes a communication control unit 11, a secure computation unit 212, a processing execution unit 513, a registration unit 501, and a storage apparatus 14 each based on the second example embodiment. A structure and a function of the secure computation unit 212 are similar to those according to the second example embodiment, and therefore overlapping detailed description thereof is omitted.

The respective units (the communication control unit 11, the processing execution unit 513, the registration unit 501, and the storage apparatus 14) other than the secure computation unit 212 differ from the second example embodiment in handling distributed service access information 517 in place of distributed salt information 216. Specifically, the storage apparatus 14 is able to store distributed master authentication information 215 and distributed service access information 517. The communication control unit 11 transmits and receives distributed service access information 517 in place of distributed salt information 216 to and from the client 400. The registration unit 501 receives distributed service access information 517 in the service registration processing instead of the user registration processing and stores the information into the storage apparatus 14. As an example of predetermined processing upon successful user authentication, the processing execution unit 513 transmits distributed service access information 517 in place of distributed salt information 216 to the client 400.

In other words, distributed service access information 517 corresponds to deposit information according to the second example embodiment. The deposit information according to the present example embodiment is also returned to the client 400 later under a condition and at a timing respectively determined by each distributed authentication apparatus 500. As an example, when authentication is determined to be successful, the communication control unit 3 according to the present example embodiment receives the deposit information (distributed service access information 517) from each distributed authentication apparatus 500.

However, a plurality of pieces of deposit information received from the respective distributed authentication apparatuses 500 are reconstructed as service access information by the secret reconstruction unit 404, according to the present example embodiment. Then, the secret reconstruction unit 404 outputs the reconstructed service access information through the output unit 111.

Next, an operation of the present example embodiment including the aforementioned configuration will be described in detail. Brief description will be provided below by omitting overlapping description of an operation similar to that of the second example embodiment. As described above, the on-line password manager according to the present example embodiment also performs three types of processing being the user registration processing, the service registration processing, and the service use processing. Operations in the respective types of processing will be sequentially described below.

Operation in User Registration Processing

Figure 7:
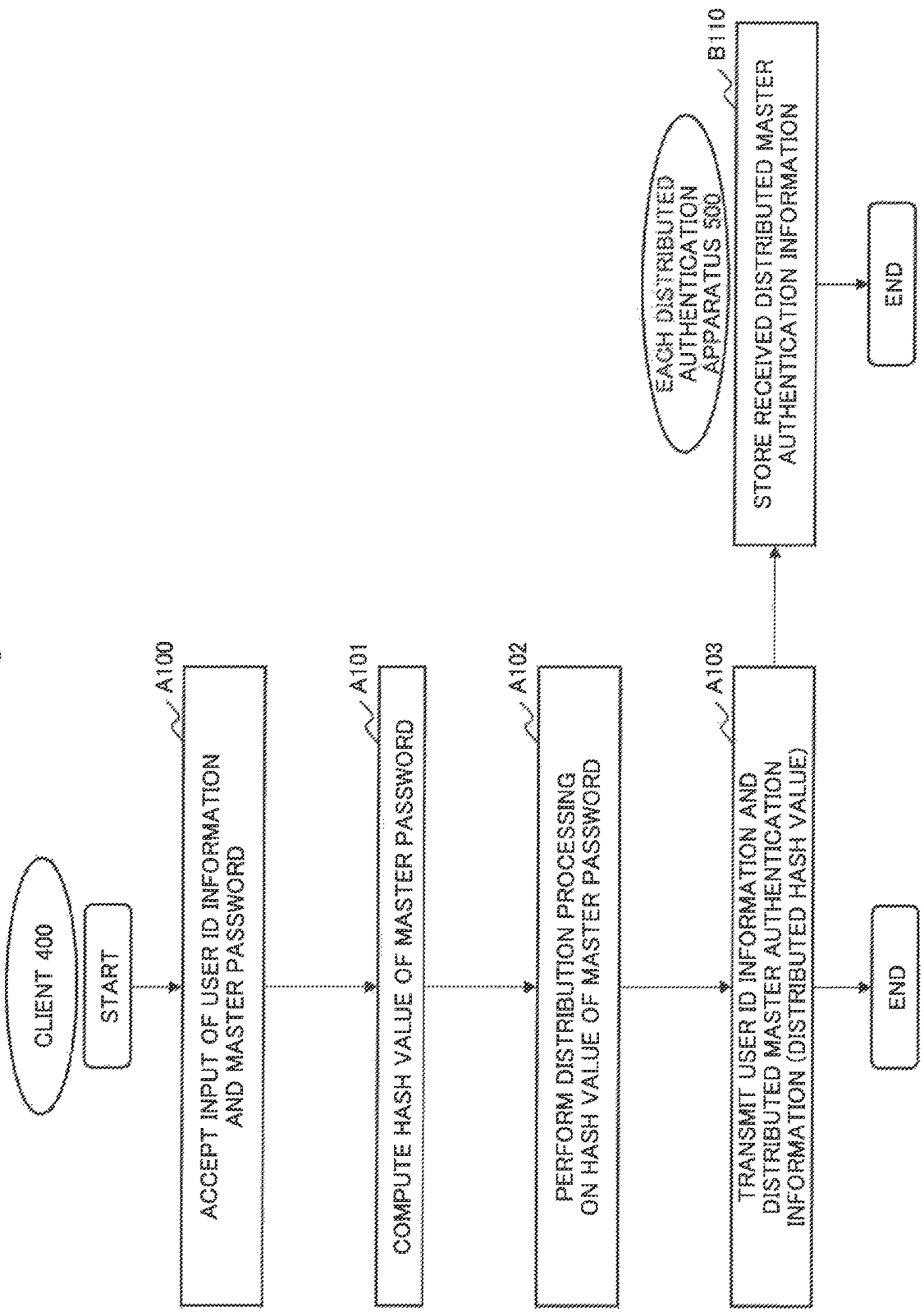
FIG. 7 is a flowchart illustrating operations performed by a client 400 and each distributed authentication apparatus 500 in user registration processing, according to the third example embodiment.

Referring to FIG. 7, an operation in the user registration processing will be described below. FIG. 7 is a flowchart illustrating operations performed by the client 400 and each distributed authentication apparatus 500 in the user registration processing according to the third example embodiment.

First, a user inputs user ID information and a master password into the client 400. In the client 400, the input unit 410 accepts the input of the user ID information and the master password (Step A100).

Next, on the basis of the input information, the authentication information generation unit 101 generates master authentication information. Similarly to the second example embodiment, the authentication information generation unit 101 computes a hash value of the master password (Step A101).

Next, the secret distribution unit 402 performs distribution processing on the generated master authentication information by the secret distribution method (Step A102).

Next, the communication control unit 3 transmits (distributes) the user ID information and the distributed hash value (distributed master authentication information 215) to each distributed authentication apparatus 500 (Step A103).

In each distributed authentication apparatus 500, the registration unit 501 receives the user ID information and the distributed master authentication information 215 through the communication control unit 11. Each registration unit 501 stores the distributed master authentication information 215, being associated with the user ID information, into the storage apparatus 14 (Step B110).

The above describes the operation in the user registration processing.

Operation in Service Registration Processing

Figure 8:
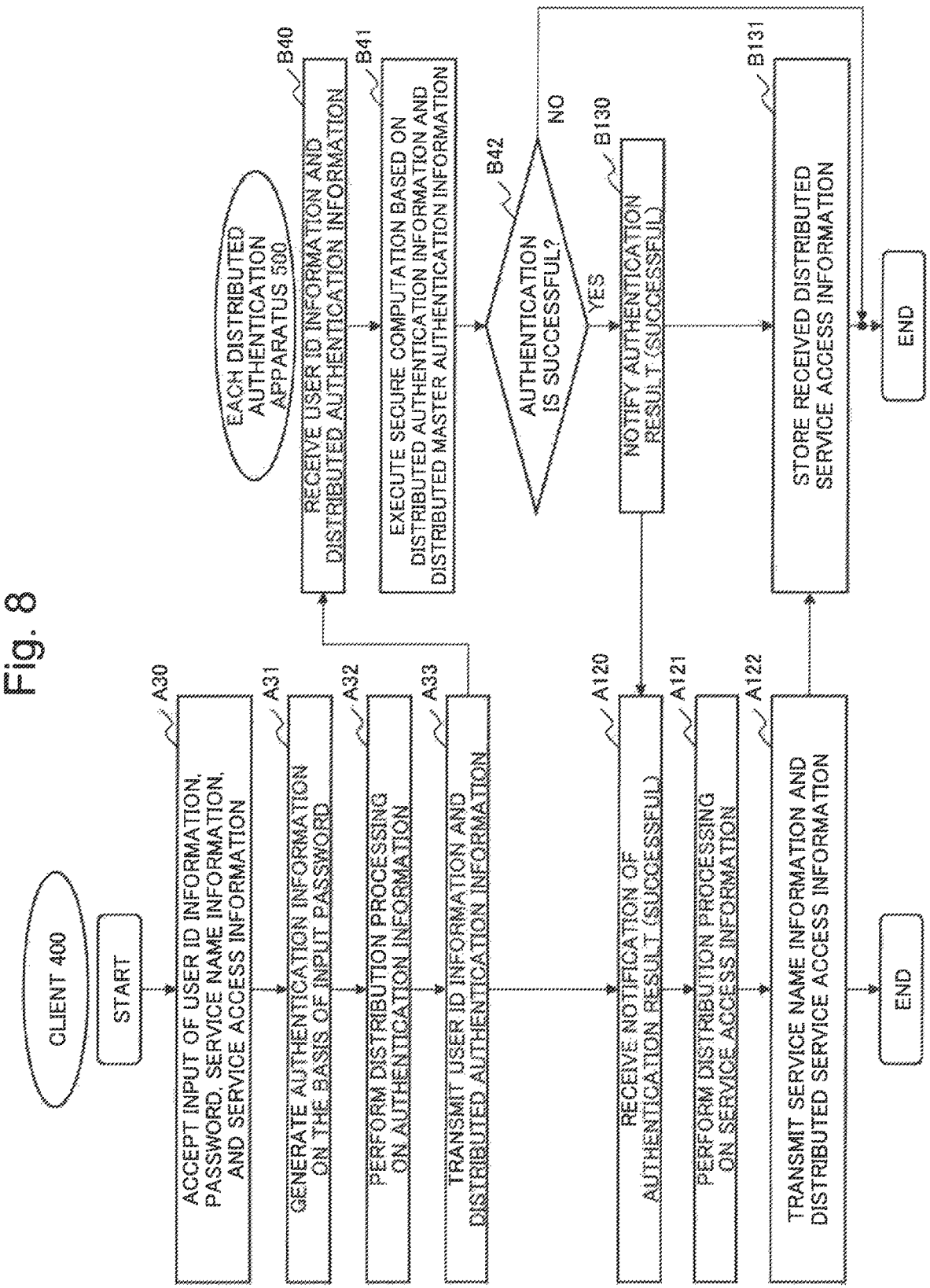
FIG. 8 is a flowchart illustrating operations performed by the client 400 and each distributed authentication apparatus 500 in service registration processing, according to the third example embodiment.

Referring to FIG. 8, an operation in the service registration processing will be described below. FIG. 8 is a flowchart illustrating operations performed by the client 400 and each distributed authentication apparatus 500 in the service registration processing according to the third example embodiment.

First, the user inputs the user ID information registered in the user registration processing, a password, service name information, and service access information into the client 400. Subsequent acceptance of the input to the input unit 410 in the client 400 (Step A30) and respective Steps up to user authentication result decision (Steps A31 to A33 and Steps B40 to B42) are similar to those according to the second example embodiment, and therefore overlapping detailed description thereof is omitted.

When the secure computation unit 212 checks that authentication is successful (YES in Step B42), the processing execution unit 513 executes predetermined processing. Specifically, as an example, the processing execution unit 513 notifies the authentication result (successful) to the client 400 (Step B130).

The notification may be executed by at least one distributed authentication apparatus 500. When the secure computation unit 212 checks that the authentication is unsuccessful (NO in Step B42), as an example, the processing execution unit 513 may simply end the processing without transmitting the authentication result (unsuccessful).

An operation in the case of successful authentication will be described below. In the client 400, the communication control unit 3 receives notification of the authentication result (successful) from at least one distributed authentication apparatus 500 (Step A120). The client 400 according to the present example embodiment is able to become aware of the successful authentication by receipt of the notification of the authentication result (successful). The above describes the user authentication undergone by the client 400.

Next, the secret distribution unit 402 performs distribution processing on the input service access information by the secret distribution method (Step A121).

Next, the communication control unit 3 transmits (distributes) the user ID information, the service name information, and the service access information being distributed (distributed service access information 517) to each distributed authentication apparatus 500 (Step A122).

In each distributed authentication apparatus 500, the registration unit 501 receives the user ID information, the service name information, and the distributed service access information 517 through the communication control unit 11. Each registration unit 501 stores the distributed service access information 517, being associated with the user ID information and the service name information, into the storage apparatus 14 (Step B131).

The above describes the operation of the service registration processing.

Operation in Service Use Processing

Figure 9:
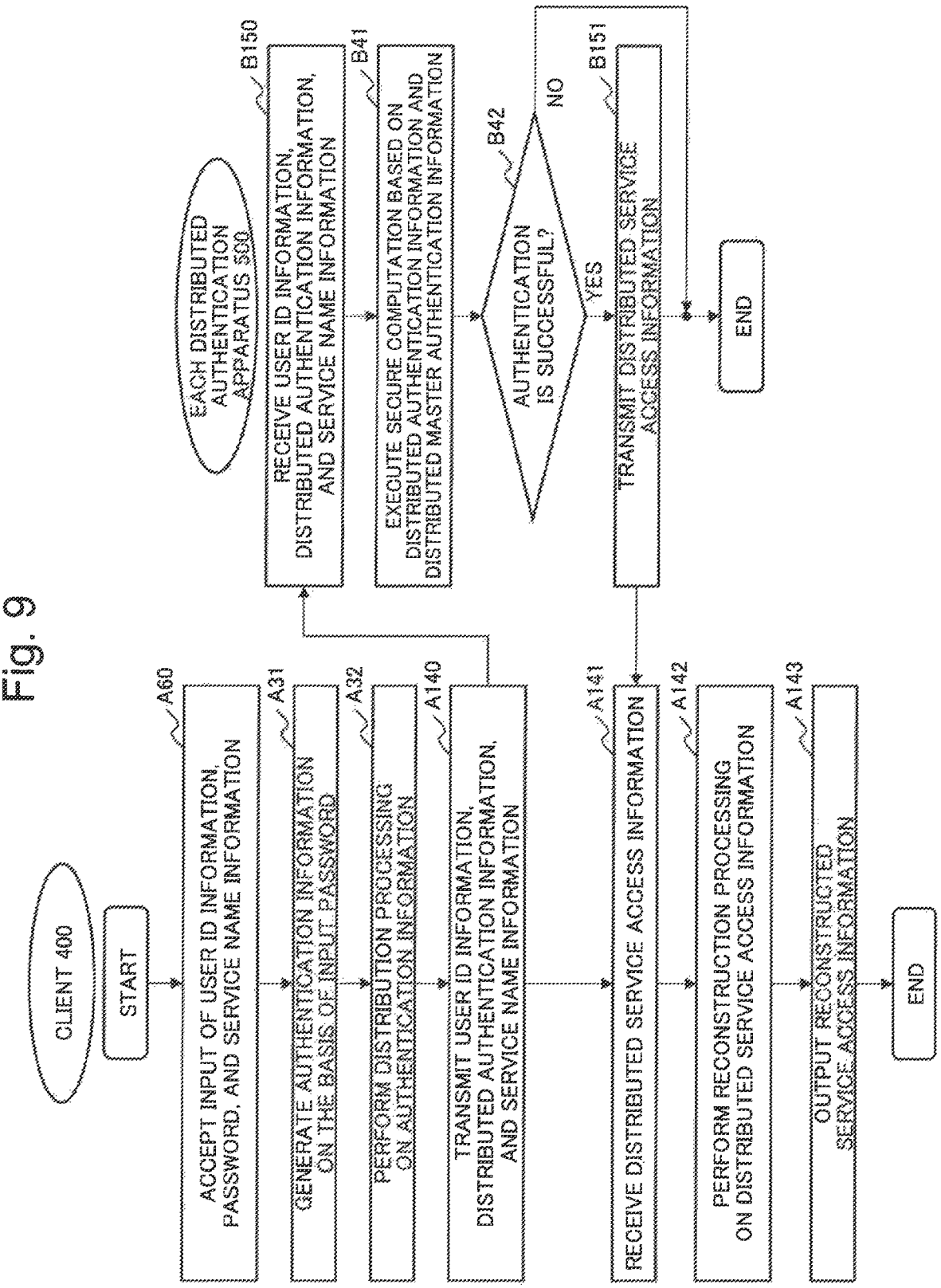
FIG. 9 is a flowchart illustrating operations performed by the client 400 and each distributed authentication apparatus 500 in service use processing, according to the third example embodiment.

Referring to FIG. 9, an operation in the service use processing will be described below. FIG. 9 is a flowchart illustrating operations performed by the client 400 and each distributed authentication apparatus 500 in the service use processing according to the third example embodiment.

First, the user inputs the user ID information, a password, and service name information into the client 400. Subsequent acceptance of the input to the input unit 410 in the client 400 (Step A60) and respective Steps up to user authentication result decision (Steps A31 to A33 and Steps B40 to B42) are basically similar to those according to the second example embodiment. However, service name information is added to the information transmitted from the client 400 to each distributed authentication apparatus 500 (Step A140). In each distributed authentication apparatus 500, the service name information is also received (Step B150). With regard to operations that are not particularly different from those according to the second example embodiment (Steps A60, A31, A32, B41, and B42), overlapping detailed description thereof is omitted.

When the secure computation unit 212 checks that authentication is successful (YES in Step B42), the processing execution unit 513 executes predetermined processing. Specifically, as an example, the processing execution unit 513 transmits distributed service access information 517 related to the user ID information and the service name information to the client 400 (Step B151).

In the client 400, the communication control unit 3 receives the distributed service access information 517 from each distributed authentication apparatus 500 (Step A141).

Next, the secret reconstruction unit 404 performs reconstruction processing on a plurality of pieces of the received distributed service access information 517 (Step A142). As a result of the reconstruction processing, the service access information input in the service registration processing is reconstructed.

Finally, the output unit 111 outputs the reconstructed service access information (Step A143). By using the output service access information, the user is able to use the desired service.

The above describes the operation of the service use processing.

As described above, in addition to an effect similar to that according to the aforementioned second example embodiment, the present example embodiment further provides an effect of securely managing service access information.

The reason is that, upon service registration, the secret distribution unit 402 in the client 400 stores into each distributed authentication apparatus 500, in a distributed manner, distributed service access information 517 obtained by distributing service access information by the secret distribution method. In other words, the present example embodiment may be considered to provide an effect that, in case of information leakage from any distributed authentication apparatus 500 constituting the system, the information cannot be used for identifying service access information.

The present example embodiment further provides an effect of simplifying a system configuration compared with the aforementioned second example embodiment.

The reason is that the present example embodiment does not require the service access information management apparatus 300 according to the second example embodiment. Furthermore, modified examples of the present example embodiment may be considered as follows.

For example, the client 400 and one of the distributed authentication apparatuses 500 may be implemented in a same information processing apparatus.

Similarly to the first example embodiment, an input master password and an input password may be used as is in whole or in part as master authentication information and authentication information, respectively.

Part of the processing sequence does not need to be followed as described above. For example, the input unit 410 may accept part of information at a timing other than that described above. Specifically, the input unit 410 may accept the information other than user ID information and a password again after successful user authentication is confirmed, instead of Step A30 in FIG. 8 or Step A60 in FIG. 9.

In this case, notification of the authentication result (successful) may be made by the distributed authentication apparatus 500 in the service use processing (FIG. 9). Subsequently, the communication control unit 3 in the client 400 may transmit service name information to each distributed authentication apparatus 500.

HW Configuration Description Example

Each of the units according to the respective aforementioned example embodiments illustrated in FIGS. 1, 2, and 6 may be configured with an independent hardware circuit or may be viewed as a function (processing) unit (software module) of a software program. However, allocation of the respective units illustrated in the drawings is a configuration for convenience of description, and various configurations may be assumed upon implementation. An example of a hardware environment in such a case will be described referring to FIG. 10.

Figure 10:
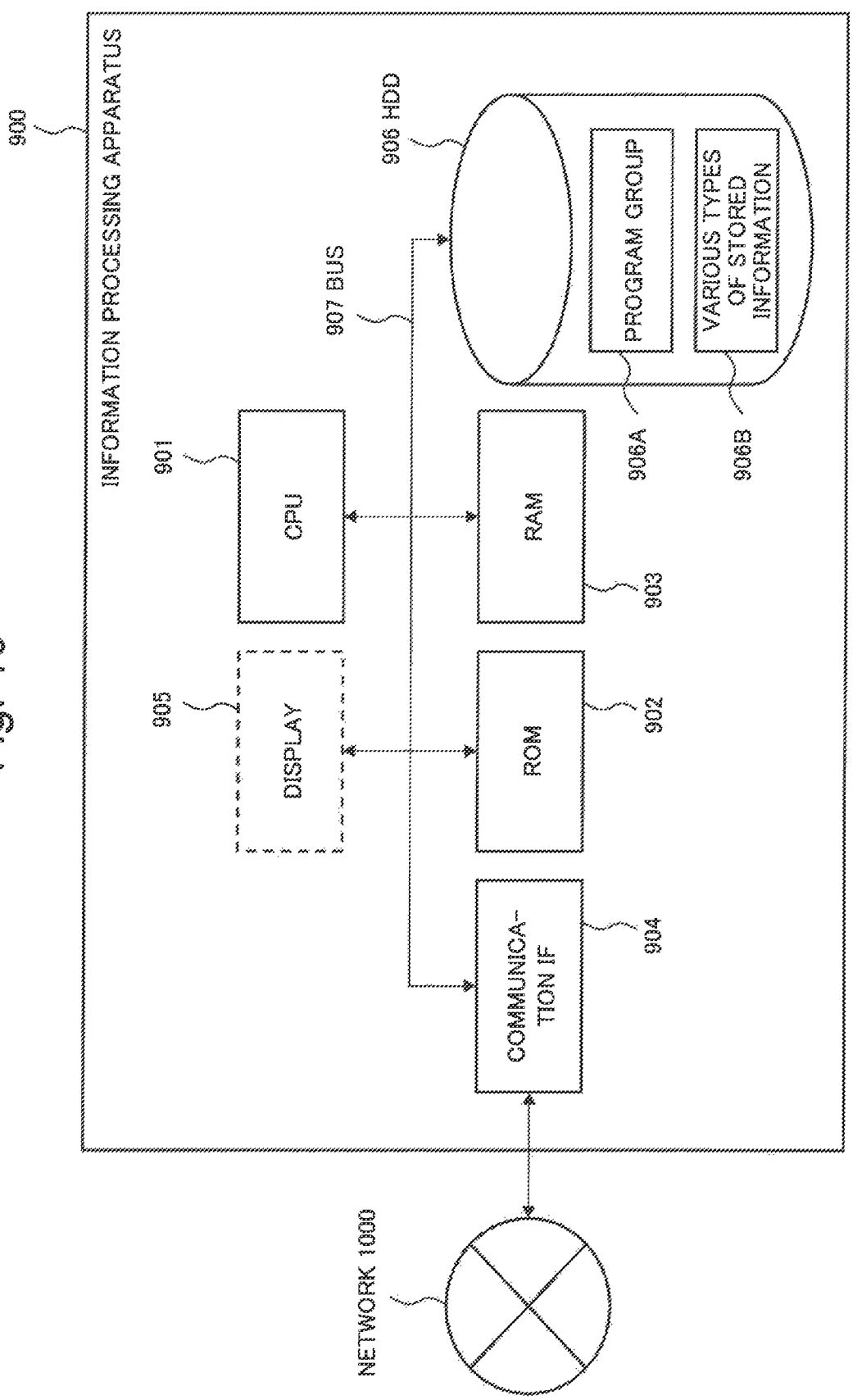
FIG. 10 is a diagram exemplifying a configuration of a computer (information processing apparatus) applicable to the authentication system or the service access information management system, according to the respective example embodiments of the present invention and modified examples thereof.

FIG. 10 is a diagram exemplifying a configuration of a computer (information processing apparatus) applicable to the authentication system and the service access information management system, according to the respective example embodiments of the present invention and the modified examples thereof. In other words, FIG. 10 illustrates a hardware environment capable of providing the respective functions according to the respective aforementioned example embodiments, the hardware environment being a configuration of a computer capable of providing at least any one of the first information processing apparatus 1, 100, and 400, the second information processing apparatus 10, 200, and 500, or the service access information management apparatus 300, according to the respective aforementioned example embodiments.

A computer 900 illustrated in FIG. 10 includes a central processing unit (CPU) 901, a read only memory (ROM) 902, a random access memory (RAM) 903, a communication interface (IF) 904, a display 905, and a hard disk device (HDD) 906, and includes a configuration in which the components are connected through a bus 907. Furthermore, when the computer illustrated in FIG. 10 functions as the first information processing apparatus 1, 100, and 400, the second information processing apparatus 10, 200, and 500, or the service access information management apparatus 300, the display 905 does not need to be provided all the time.

The communication interface 904 is a common communication means providing communication between the respective computers, according to the respective aforementioned example embodiments. The hard disk device 906 stores a program group 906A and various types of stored information 906B. For example, the program group 906A is a computer program for providing functions related to the respective blocks (respective units) illustrated in aforementioned FIGS. 1, 2, and 6. For example, the various types of stored information 906B include the distributed master authentication information 15 and 215, the distributed salt information 216, the encrypted service access information 304, and the distributed service access information 517 illustrated in FIGS. 1, 2, and 6. In such a hardware configuration, the CPU 901 controls an entire operation of the computer 900.

The present invention described by taking the respective aforementioned example embodiments as examples is achieved by supplying a computer program capable of providing the functions of the block diagrams (FIGS. 1, 2, and 6) or the flowcharts (FIGS. 3 to 5 and FIGS. 7 to 9) referred to in the description of the respective example embodiments, and then reading the computer program into the CPU 901 in the hardware and executing the program. Further, the computer program supplied into the computer may be stored in the RAM 903 being a readable-writable temporary storage memory or a nonvolatile storage device (storage medium) such as the hard disk device 906.

In the case described above, the supply method of the computer program into the respective apparatuses may employ a currently common procedure such as a method of installation into the apparatus through various recording media such as a floppy disk (registered trademark) or a compact disc-ROM (CD-ROM). A method of external download through a communication network 1000 such as the Internet is also a common supply method of the computer program into the respective apparatus. In such a case, the present invention may be viewed to be configured with a code constituting such a computer program or a computer-readable storage medium recording such a code.

The present invention has been described with the aforementioned example embodiments as exemplary examples. However, the present invention is not limited to the aforementioned example embodiments. In other words, various modes that may be understood by a person skilled in the art may be applied to the present invention, within the scope thereof.

A part or all of the respective exemplary embodiments and the modified examples thereof can be described also as the following supplementary notes. However, the present invention having been illustratively described using the exemplary embodiments and the examples is not limited to the following description, i.e., (Supplementary Note 1)

A second information processing apparatus comprising:

secure computation means that checks whether or not authentication information matches master authentication information, by executing secure computation through communication with another second information processing apparatus, on the basis of one piece of distributed master authentication information obtained by distributing, by a secret distribution method, the master authentication information being information checked upon authentication on one side, the distributed master authentication information being previously stored, and one piece of distributed authentication information obtained by distributing, by a secret distribution method, the authentication information being information checked upon the authentication on another side, the distributed authentication information being received from a first information processing apparatus connected through communication; and processing execution means that executes predetermined processing depending on a check result.

(Supplementary Note 2)

The second information processing apparatus according to Supplementary Note 1, further comprising registration means that stores one piece of the distributed master authentication information received from the first information processing apparatus, into a storage apparatus, wherein the secure computation means executes the secure computation, based on one piece of the distributed master authentication information read from the storage apparatus.

(Supplementary Note 3)

The second information processing apparatus according to Supplementary Note 2, wherein the registration means receives deposit information being information previously deposited from the first information processing apparatus and stores the received deposit information into a storage apparatus, and, when the check result is successful authentication indicating that the authentication information matches the master authentication information, the processing execution means transmits the deposit information to the first information processing apparatus as the predetermined processing.

(Supplementary Note 4)

The second information processing apparatus according to any one of Supplementary Notes 1 to 3, wherein the master authentication information is a hash value based on a first character string, the authentication information is a hash value based on a second character string, and the secure computation means checks whether or not the authentication information matches the master authentication information, by combining secure computation performing hash computation with secure computation checking for match.

(Supplementary Note 5)

The second information processing apparatus according to any one of Supplementary Notes 1 to 4, wherein the master authentication information is a master password including a character string, and the authentication information is a password including a character string input to the first information processing apparatus.

(Supplementary Note 6)

The second information processing apparatus according to any one of Supplementary Notes 3 to 5, wherein the deposit information is one piece of information obtained by distributing, by a secret distribution method, salt information related to encryption processing in the first information processing apparatus.

(Supplementary Note 7)

A first information processing apparatus being connected to a system including a plurality of the second information processing apparatuses according to any one of Supplementary Notes 1 to 6, the first information processing apparatus comprising:

secret distribution means that distributes authentication information based on input first input information into a plurality of pieces of distributed authentication information by a secret distribution method; and communication control means that transmits the respective pieces of distributed authentication information to the plurality of second information processing apparatuses in a distributed manner.

(Supplementary Note 8)

The first information processing apparatus according to Supplementary Note 7, further comprising authentication information generation means that generates the master authentication information, based on input second input information, and generates the authentication information, based on the first input information, wherein the secret distribution means further performs processing of distributing, by a secret distribution method, the generated master authentication information into a plurality of pieces of distributed master authentication information, and the communication control means further performs processing of transmitting the respective pieces of distributed master authentication information to the plurality of second information processing apparatuses in a distributed manner.

(Supplementary Note 9)

The first information processing apparatus according to Supplementary Note 8, wherein the authentication information generation means generates a hash value based on the second input information as the master authentication information and generates a hash value based on the first input information as the authentication information.

(Supplementary Note 10)

The first information processing apparatus according to any one of Supplementary Notes 7 to 9, wherein the secret distribution means further performs processing of distributing, by a secret distribution method, input third input information as a plurality of pieces of the deposit information, and the communication control means further transmits the respective pieces of deposit information to the plurality of second information processing apparatuses in a distributed manner and receives the respective pieces of deposit information from the plurality of second information processing apparatuses, and the first information processing apparatus further comprising secret reconstruction means that reconstructs a plurality of pieces of the received deposit information to the third input information by a secret distribution method and outputs the reconstructed third input information.

(Supplementary Note 11)

The first information processing apparatus according to Supplementary Note 10, further comprising encryption means that generates an encryption key, based on the reconstructed third input information, and encrypts input fourth input information by using the encryption key, wherein the communication control means further transmits the encrypted fourth input information to a third information processing apparatus, and, when receiving the deposit information from the plurality of second information processing apparatuses, receives the encrypted fourth input information from the third information processing apparatus, and the first information processing apparatus further comprising decryption means that generates a decryption key, based on the reconstructed third input information, decrypts the received encrypted fourth input information to the fourth input information with the decryption key, and outputs the decrypted fourth input information.

(Supplementary Note 12)

The first information processing apparatus according to any one of Supplementary Notes 7 to 11, wherein the first input information is a password including a character string input upon authentication.

(Supplementary Note 13)

The first information processing apparatus according to any one of Supplementary Notes 8 to 12, wherein the second input information is a master password including a character string input prior to authentication.

(Supplementary Note 14)

The first information processing apparatus according to any one of Supplementary Notes 10, 12, and 13, wherein the third input information is service access information being information used when accessing a service.

(Supplementary Note 15)

The first information processing apparatus according to any one of Supplementary Notes 11 to 13, wherein the third input information is salt information used for generation of the encryption key and the decryption key, and the fourth input information is service access information being information used when accessing a service.

(Supplementary Note 16)

An authentication system comprising:

the first information processing apparatus according to any one of Supplementary Notes 7 to 15; and a plurality of the second information processing apparatuses according to any one of Supplementary Notes 1 to 6, being connected to the first information processing apparatus.

(Supplementary Note 17)

The authentication system according to Supplementary Note 16, comprising the first information processing apparatus according to Supplementary Note 11 or 15 as the first information processing apparatus, and further comprising the third information processing apparatus.

(Supplementary Note 18)

An authentication method comprising:

distributing, by a secret distribution method, authentication information based on first input information input to a first information processing apparatus into a plurality of pieces of distributed authentication information;

transmitting the respective pieces of distributed authentication information in a distributed manner from the first information processing apparatus to a plurality of second information processing apparatuses previously storing, in a distributed manner, respective pieces of distributed master authentication information being information obtained by distributing, by a secret distribution method, master authentication information being information checked upon authentication;

checking whether or not the authentication information matches the master authentication information, by executing secure computation through communication between at least part of the plurality of second information processing apparatuses, based on the distributed authentication information received from the first information processing apparatus and the distributed master authentication information; and executing, by at least one of the plurality of second information processing apparatuses executing the secure computation, predetermined processing depending on the check result.

(Supplementary Note 19)

The authentication method according to Supplementary Note 18, further comprising:

further generating the master authentication information, based on second input information input to the first information processing apparatus;

further distributing the master authentication information into a plurality of pieces of distributed master authentication information by a secret distribution method;

further transmitting the respective pieces of distributed master authentication information in a distributed manner from the first information processing apparatus to the plurality of second information processing apparatuses; and further storing, in each of the second information processing apparatuses, the distributed master authentication information received from the first information processing apparatus.

(Supplementary Note 20)

The authentication method according to Supplementary Note 19, further comprising:

generating a hash value based on the second input information as the master authentication information;

generating a hash value based on the first input information as the authentication information; and checking whether or not the authentication information matches the master authentication information, by combining secure computation performing hash computation with secure computation checking for match.

(Supplementary Note 21)

The authentication method according to any one of Supplementary Notes 18 to 20, further comprising:

further distributing, by a secret distribution method, third input information input to the first information processing apparatus, as a plurality of pieces of deposit information;

further transmitting the respective pieces of deposit information in a distributed manner from the first information processing apparatus to the plurality of second information processing apparatuses;

further storing, in each of the second information processing apparatuses, the deposit information received from the first information processing apparatus;

as the predetermined processing, transmitting the stored deposit information from at least one of the plurality of second information processing apparatuses to the first information processing apparatus;

further reconstructing a plurality of pieces of the received deposit information to the third input information by a secret distribution method; and further outputting the reconstructed third input information.

(Supplementary Note 22)

The authentication method according to Supplementary Note 21, further comprising:

further generating an encryption key, based on the reconstructed third input information;

further encrypting fourth input information input to the first information processing apparatus, by using the encryption key;

further transmitting the encrypted fourth input information to a third information processing apparatus;

when receiving the deposit information from the plurality of second information processing apparatuses, further receiving the encrypted fourth input information from the third information processing apparatus;

further generating a decryption key, based on the reconstructed third input information;

further decrypting the received encrypted fourth input information to the fourth input information with the decryption key; and further outputting the decrypted fourth input information.

(Supplementary Note 23)

A recording medium for recording a first computer program causing a computer being a second information processing apparatus to execute:

secure computation processing of checking whether or not authentication information matches master authentication information, by executing secure computation through communication with another second information processing apparatus, based on
- one piece of distributed master authentication information obtained by distributing, by a secret distribution method, the master authentication information being information checked upon authentication on one side, the distributed master authentication information being previously stored, and
- one piece of distributed authentication information obtained by distributing, by a secret distribution method, the authentication information being information checked upon the authentication on another side, the distributed authentication information being received from a first information processing apparatus connected through communication; and check execution processing of executing predetermined processing depending on the check result.

(Supplementary Note 24)

The recording medium for recording the first computer program according to Supplementary Note 23, the first computer program further including registration processing of storing one piece of the distributed master authentication information received from the first information processing apparatus, into a storage apparatus, wherein, in the secure computation processing, the secure computation is executed based on one piece of the distributed master authentication information read from the storage apparatus.

(Supplementary Note 25)

The recording medium for recording the first computer program according to Supplementary Note 23 or 24, the first computer program further including deposit information registration processing of receiving deposit information being information previously deposited from the first information processing apparatus, and storing the received deposit information into a storage apparatus, wherein, in the check execution processing, when the check result is successful authentication indicating that the authentication information matches the master authentication information, the deposit information is transmitted to the first information processing apparatus, as the predetermined processing.

(Supplementary Note 26)

The recording medium for recording the first computer program according to any one of Supplementary Notes 23 to 25, wherein the master authentication information is a hash value based on a first character string, the authentication information is a hash value based on a second character string, and, in the secure computation processing, whether or not the authentication information matches the master authentication information is checked by combining secure computation performing hash computation with secure computation checking for match.

(Supplementary Note 27)

A recording medium for recording a second computer program causing a computer to execute:

secret distribution processing of distributing, by a secret distribution method, authentication information based on input first input information into a plurality of pieces of distributed authentication information; and communication control processing of transmitting the respective pieces of distributed authentication information in a distributed manner to a plurality of information processing apparatuses executing the first computer program according to any one of Supplementary Notes 23 to 26.

(Supplementary Note 28)

The recording medium for recording the second computer program according to Supplementary Note 27, further causing the computer to execute:

authentication information generation processing of generating the master authentication information, based on input second input information, and generating the authentication information, based on the first input information;

processing of distributing the generated master authentication information into a plurality of pieces of distributed master authentication information by a secret distribution method; and processing of transmitting the respective pieces of distributed master authentication information in a distributed manner to the plurality of information processing apparatuses.

(Supplementary Note 29)

The recording medium for recording the second computer program according to Supplementary Note 28, wherein, in the authentication information generation processing, a hash value based on the second input information is generated as the master authentication information, and a hash value based on the first input information is generated as the authentication information.

(Supplementary Note 30)

The recording medium for recording the second computer program according to any one of Supplementary Notes 27 to 29, further causing a computer to execute:

processing of distributing input third input information as a plurality of pieces of the deposit information by a secret distribution method; and processing of transmitting the respective pieces of deposit information in a distributed manner to the plurality of information processing apparatuses, wherein, when the respective pieces of deposit information are received from the plurality of information processing apparatuses, a plurality of pieces of the received deposit information are reconstructed to the third input information by a secret distribution method, and the reconstructed third input information is further output.

(Supplementary Note 31)

The recording medium for recording the second computer program according to Supplementary Note 30, further causing a computer to execute:

encryption processing of generating an encryption key, based on the reconstructed third input information, and encrypting input fourth input information by using the encryption key;

processing of transmitting the encrypted fourth input information to a third information processing apparatus;

processing of receiving the encrypted fourth input information from the third information processing apparatus when receiving the deposit information from the plurality of second information processing apparatuses; and decryption processing of generating a decryption key, based on the reconstructed third input information, decrypting the received encrypted fourth input information to the fourth input information with the decryption key, and outputting the decrypted fourth input information.

REFERENCE SIGNS LIST

1 First information processing apparatus
2, 102, 402 Secret distribution unit
3, 11, 301 Communication control unit
10 Second information processing apparatus
12, 212 Secure computation unit
13, 213, 513 Processing execution unit
14, 303 Storage apparatus
15, 215 Distributed master authentication information
20 Input information
100, 400 Client (First information processing apparatus)
101 Authentication information generation unit
103 Encryption unit 104, 404 Secret reconstruction unit
105 Decryption unit
110, 410 Input unit
111 Output unit
200, 500 Distributed authentication apparatus (Second information processing apparatus)
201, 501 Registration unit
216 Distributed salt information
300 Service access information management apparatus
302 Management unit
304 Encrypted service access information
517 Distributed service access information

The invention claimed is:

1. A second information processing apparatus comprising:
a memory; and
a processor, the processor configured to:
receive distributed salt information at a time of a user registration processing, the distributed salt information being a portion of a salt, wherein a user has registered the salt used in encryption and decryption of service access information;
store the distributed salt information;
check whether or not authentication information matches master authentication information, by executing secure computation through communication with another second information processing apparatus, wherein the processor is configured to execute the secure computation in a distributed manner, without entailing data reconstruction and to perform the check without collecting distributed authentication information grouped in one place, the check being on a basis of:
one piece of distributed master authentication information obtained by distributing, by a secret distribution method of portions of the master authentication information to each of the second information processing apparatus and the another second information processing apparatus, the distributed master authentication information being previously stored, whereby each of the second information processing apparatus and the another second information processing apparatus have received and stored one piece of the distributed master authentication information at a time of user registration, and
one piece of the distributed authentication information obtained by distributing, by the secret distribution method of portions of the authentication information to the second information processing apparatus and the another second information processing apparatus, the distributed authentication information being received from a first information processing apparatus, whereby each of the at least the second information processing apparatus and the another second information processing apparatus have stored one piece of the distributed authentication information; and
execute predetermined processing depending on a check result, wherein
the predetermined processing, when the authentication information matches the master authentication information, includes transmitting the distributed salt information to the first information processing apparatus to enable a service access by the user.

2. The second information processing apparatus according to claim 1, wherein
the processor is further configured to store the one piece of the distributed master authentication information received from the first information processing apparatus, and
the processor is further configured to execute the secure computation, based on the one piece of the distributed master authentication information stored.

3. The second information processing apparatus according to claim 1, wherein
the master authentication information is a hash value based on a first character string,
the authentication information is a hash value based on a second character string, and
the processor is further configured to check whether or not the authentication information matches the master authentication information, by combining secure computation performing hash computation with secure computation checking for match.

4. An authentication method by a second information processing apparatus comprising, the authentication method comprising:
receiving distributed salt information at a time of a user registration processing, the distributed salt information being a portion of a salt, wherein a user has registered the salt used in encryption and decryption of service access information;
storing the distributed salt information;
checking whether or not authentication information matches master authentication information, by executing secure computation through communication with another second information processing apparatus, wherein the processor is configured to execute the secure computation in a distributed manner, without entailing data reconstruction and to perform the checking without collecting distributed authentication information grouped in one place, the checking being on a basis of:
one piece of distributed master authentication information obtained by distributing, by a secret distribution method of portions of the master authentication information to each of the second information processing apparatus and the another second information processing apparatus, the distributed master authentication information being previously stored, whereby each of the second information processing apparatus and the another second information processing apparatus have previously received and stored one piece of the distributed master authentication information at a time of user registration, and
one piece of the distributed authentication information obtained by distributing, by the secret distribution method of portions of the authentication information to each of the second information processing apparatus and the another second information processing apparatus, the distributed authentication information being received from a first information processing apparatus, whereby each of the second information processing apparatus and the another second information processing apparatus have stored one piece of the distributed authentication information; and
executing predetermined processing depending on a check result, wherein
the predetermined processing, when the authentication information matches the master authentication information, includes transmitting the distributed salt information to the first information processing apparatus to enable a service access by the user.

5. The authentication method according to claim 4, further comprising:
further generating the master authentication information, based on second input information input to the first information processing apparatus;
further distributing the master authentication information into a plurality of pieces of distributed master authentication information by the secret distribution method;
further transmitting the respective pieces of distributed master authentication information in a distributed manner from the first information processing apparatus to a plurality of second information processing apparatuses, whereby each of the plurality of second information processing apparatuses stores one piece of the plurality of pieces of the distributed master authentication information, wherein the plurality of second information processing apparatuses comprise the second information processing apparatus and the another second processing apparatus; and
further storing, in each of the second information processing apparatuses, one piece of the distributed master authentication information received from the first information processing apparatus.

6. The authentication method according to claim 5, further comprising:
generating a hash value based on the second input information as the master authentication information;
generating a hash value based on the first input information as the authentication information; and
checking whether or not the authentication information matches the master authentication information, by combining secure computation performing hash computation with secure computation checking for match.

7. The authentication method according to claim 4, further comprising:
further reconstructing, by a secret distribution method, a plurality of pieces of the distributed salt information to the salt; and
further outputting the salt reconstructed.

8. The authentication method according to claim 7, further comprising:
further generating an encryption key, based on the salt reconstructed;
further encrypting the service access information input to the first information processing apparatus, by using the encryption key;
further transmitting the encrypted service access information to a third information processing apparatus;
when receiving the distributed salt information from the plurality of second information processing apparatuses, further receiving the encrypted service access information from the third information processing apparatus;
further generating a decryption key, based on the reconstructed salt;
further decrypting the received encrypted service access information with the decryption key; and
further outputting the decrypted service access information.

9. A non-transitory recording medium for recording a first computer program causing a computer being a second information processing apparatus to execute:
receiving distributed salt information at a time of a user registration processing, the distributed salt information being a portion of a salt, wherein a user has registered the salt used in encryption and decryption of service access information;
storing the distributed salt information;
checking whether or not authentication information matches master authentication information, by executing secure computation through communication with another second information processing apparatus, including executing the secure computation in a distributed manner, without entailing data reconstruction and to perform the checking without collecting distributed authentication information grouped in one place, the checking being on a basis of:
one piece of distributed master authentication information obtained by distributing, by a secret distribution method of portions of the master authentication information to each of the second information processing apparatus and the another second information processing apparatus, the distributed master authentication information being previously stored, whereby each of the second information processing apparatus and the another second information processing apparatus have previously received and stored one piece of the distributed master authentication information at a time of user registration, and
one piece of the distributed authentication information obtained by distributing, by the secret distribution method of portions of the authentication information to each of the second information processing apparatus and the another second information processing apparatus, the distributed authentication information being received from a first information processing apparatus, whereby each of the second information processing apparatus and the another second information processing apparatus have stored one piece of the distributed authentication information; and
executing predetermined processing depending on a check result, wherein
the predetermined processing, when the authentication information matches the master authentication information, includes transmitting the distributed salt information to the first information processing apparatus to enable a service access by the user.

* * * * *